US012192431B2

(12) United States Patent
Sadakuni

(10) Patent No.: US 12,192,431 B2
(45) Date of Patent: Jan. 7, 2025

(54) PRINTING SYSTEM FOR PRINTING AT VARIOUS LOCATIONS

(71) Applicant: SEIKO EPSON CORPORATION, Tokyo (JP)

(72) Inventor: Kei Sadakuni, Kiyosu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/815,855

(22) Filed: Jul. 28, 2022

(65) Prior Publication Data

US 2023/0035111 A1  Feb. 2, 2023

(30) Foreign Application Priority Data

Jul. 29, 2021  (JP) .................. 2021-124155

(51) Int. Cl.
  *H04N 1/34*  (2006.01)
  *B41J 2/175*  (2006.01)
  *G06F 3/12*  (2006.01)

(52) U.S. Cl.
  CPC .......... *H04N 1/346* (2013.01); *B41J 2/17566* (2013.01); *G06F 3/1203* (2013.01); *G06F 3/121* (2013.01); *G06F 3/126* (2013.01); *B41J 2002/17589* (2013.01); *G06F 3/1205* (2013.01); *G06F 3/1218* (2013.01); *G06F 3/1219* (2013.01); *G06F 3/1226* (2013.01)

(58) Field of Classification Search
  None
  See application file for complete search history.

(56) References Cited

U.S. PATENT DOCUMENTS

| 2002/0073002 A1 | 6/2002 | Horii et al. |
| 2005/0206949 A1* | 9/2005 | Iseki ................... G06Q 30/0226 358/1.15 |
| 2007/0103716 A1* | 5/2007 | Shiraiwa .............. G06Q 20/145 358/1.14 |

(Continued)

FOREIGN PATENT DOCUMENTS

| JP | 2002-036582 | 2/2002 |
| JP | 2009193520 A * | 8/2009 |

(Continued)

OTHER PUBLICATIONS

JP-2009193520-A English Translation, Okamoto, par 0051-0052, 0061-0063, 0068-0080 (Year: 2009).*

Primary Examiner — Miya J Cato
(74) Attorney, Agent, or Firm — WORKMAN NYDEGGER

(57) ABSTRACT

A printing system includes an acquirer, a comparator, a calculator, and an allocator. The acquirer acquires the number of media printed by a first printing device installed at a first location. The comparator compares the number of printed media acquired by the acquirer with the number of media specified based on a billing amount. The calculator calculates a first number of printable media of the first printing device based on the comparison by the comparator. The allocator allocates at least a part of the first number of printable media calculated by the calculator as a second number of printable media to a second printing device installed at a second location. The second printing device can perform printing as a billing target based on the second number of printable media.

17 Claims, 10 Drawing Sheets

(56) References Cited

U.S. PATENT DOCUMENTS

| | | | | |
|---|---|---|---|---|
| 2010/0118340 | A1* | 5/2010 | Yamada | G06F 3/1288 |
| | | | | 358/1.15 |
| 2011/0235085 | A1* | 9/2011 | Jazayeri | G06F 3/1238 |
| | | | | 358/1.14 |
| 2013/0057918 | A1* | 3/2013 | Ohta | G06F 3/1291 |
| | | | | 358/1.15 |
| 2020/0104079 | A1* | 4/2020 | Miyashita | G06F 3/1239 |
| 2022/0171576 | A1* | 6/2022 | Yamada | G06F 3/1285 |
| 2022/0222020 | A1* | 7/2022 | Miyazawa | G06F 3/1219 |

FOREIGN PATENT DOCUMENTS

| | | |
|---|---|---|
| JP | 2018-147067 | 9/2018 |
| WO | WO-2022072958 A1 * | 4/2022 |

* cited by examiner

| | DURING WORK | OUTSIDE OF WORK |
|---|---|---|
| ALLOCATION OF NUMBER OF PRINTABLE MEDIA | ON | OFF |
| BEARING OF COST OF RECOVERY OPERATION | COMPANY | TELEWORKER |
| STORAGE OF PRINT DATA | COPY TO COMPANY SERVER | — |

CT

PRINTING SYSTEM FOR PRINTING AT VARIOUS LOCATIONS

The present application is based on, and claims priority from JP Application Serial Number 2021-124155, filed Jul. 29, 2021, the disclosure of which is hereby incorporated by reference herein in its entirety.

BACKGROUND

1. Technical Field

The present disclosure relates to a printing system including a printing device that performs printing on a medium such as a paper sheet.

2. Related Art

For example, as described in JP-A-2002-36582, there is a service in which a printer is installed in an office for a flat rate and printing is performed on a predetermined number of media or less. For a large printer that is used in a company's office or the like, a monthly subscription contract for a flat-rate printing service is made in many cases.

However, in the above-described service provided by a printing system for a printing device such as the printer described in JP-A-2002-36582, the number of media to be printed in an office may decrease due to teleworking or the like. That is, when the number of teleworkers increases, there is a problem that the company's printer is not used and thus it is not possible to use up the number of media specified in the subscription contract. For example, only about half of the specified number of media can be used up in a certain case. In this case, a monthly fee is high for the number of printed media, which is disadvantageous to a user.

SUMMARY

To solve the aforementioned problem, according to an aspect of the present disclosure, a printing system includes an acquirer that acquires the number of media printed by a first printing device installed at a first location, a comparator that compares the number of media acquired by the acquirer with the number of media specified based on a billing amount, a calculator that calculates a first number of printable media of the first printing device based on the comparison by the comparator, and an allocator that allocates a part of the first number of printable media calculated by the calculator as a second number of printable media to a second printing device installed at a second location. The second printing device performs printing based on the second number of printable media.

DESCRIPTION OF EXEMPLARY EMBODIMENTS

Figure 1:
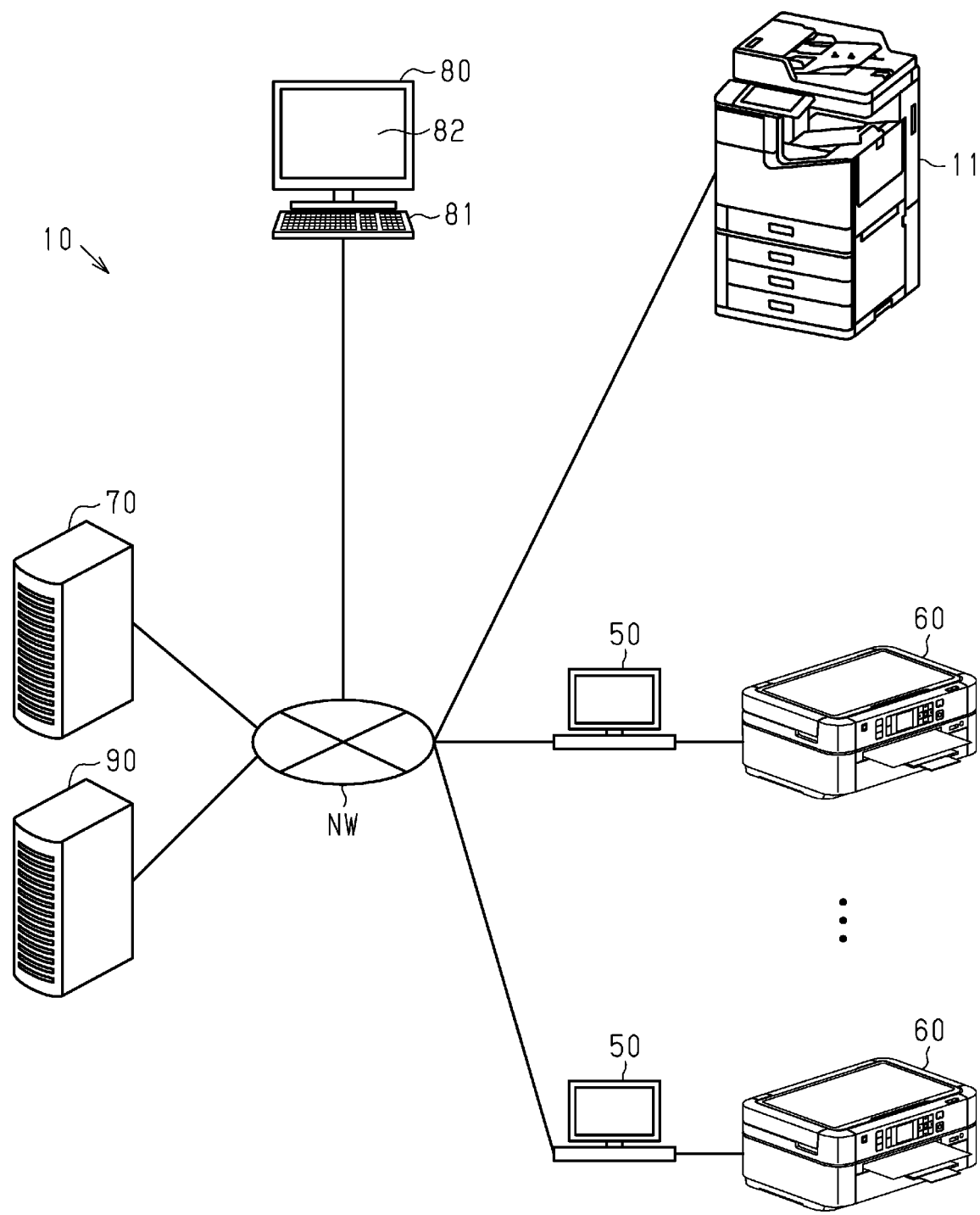
FIG. 1 is a schematic diagram illustrating a printing system according to an embodiment.

Hereinafter, an embodiment of a printing system is described with reference to the drawings. FIG. 1 illustrates a printing system 10 that charges for a printing device 11 according to a printing volume. As illustrated in FIG. 1, the printing system 10 includes one or a plurality of first printing devices 11, one or a plurality of second printing devices 60, a management terminal 80 of a company, and a company server 70 having, built therein, an attendance system 74 (see FIG. 5) of the company. In addition, the printing system 10 may include a service provider server 90 owned by a service providing company or an agent that is a subject of a subscription contract. The first printing device 11 is, for example, an office printer installed at an office (company) that is an example of a first location. In addition, the second printing device 60 is a home printer installed at a location that is an example of a second location and is not the office. In the embodiment, each of the printing device 11 and the second printing device 60 is an ink jet printer that performs printing by ejecting ink onto a medium such as a paper sheet. The ink is an example of a liquid. Since each of the first printing device 11 and the second printing device 60 ejects a liquid such as ink onto a medium such as a paper sheet, it can be said that each of the first printing device 11 and the second printing device 60 is a liquid ejecting device.

In the embodiment, the printing system 10 is configured to be able to manage the amount of a liquid, such as ink, consumed by the first printing device 11 for printing and the number of media printed. The printing system 10 includes the first printing device 11, an information terminal 50, the second printing device 60, the company server 70, the management terminal 80 of the company, and the service provider server 90 in a state in which the first printing device 11, the information terminal 50, the second printing device 60, the company server 70, the management terminal 80 of the company, and the service provider server 90 can communicate with each other via a network NW. The first printing device 11, the company server 70, and the management terminal 80 of the company are connected to each other via a LAN in the company.

The first printing device 11 is an office printer of the company that has the subscription contract with a service company that manages the service provider server 90. The first printing device 11 performs printing on a medium M (see FIG. 2) such as a paper sheet by ejecting a liquid such as ink onto the medium M. The first printing device 11 is communicably connected to a plurality of host devices 40 (see FIG. 5) via an in-house network, which includes an in-house LAN. The plurality of host devices 40 is installed in the office (company) that is the first location. An employee who works for the company causes a host device 40 among the plurality of host devices 40 to output a print instruction to the first printing device 11 in order to use the first printing device 11 to perform printing. The print instruction is given by outputting print data PD from the host device 40 to the first printing device 11.

The second printing device 60 is connected to the network NW via the information terminal 50 that is a personal computer or the like, for example. The second printing device 60 is a home printer owned by an employee of the company at an employee's own home. The company has the subscription contract with the service company. The employee's own home is an example of the second location. Therefore, the second printing device 60 is installed at the own home where the employee works. The second location at which the second printing device 60 is installed is not limited to the own home and may be a satellite office where the employee works.

The company server 70 manages a system of the entire company. The company server 70 includes the attendance system 74 that manages attendances in the company.

The management terminal 80 is an information terminal managed by the company. The management terminal 80 can access the first printing device 11.

The service provider server 90 is managed by a maker of the first printing device 11 or a sales company of the first printing device 11. The service provider server 90 is managed by the maker or the sales company that has the subscription contract with the company that is a customer or the like. The subscription contract may be made with an agency of the maker or an agency of the sales company.

Although FIG. 1 illustrates an example in which the customer rents a single first printing device 11 according to the subscription contract, a plurality of first printing devices 11 may be rented according to the subscription contract. In addition, subscription contracts may be individually made for each of the first printing devices 11. Alternatively, a subscription contract may be made for a plurality of first printing devices 11. An example in which the customer rents a single first printing device 11 according to the subscription contract is described below.

A plurality of information terminals 50 is connected to the network NW. Each of the information terminals 50 is installed at a telework site (hereinafter also referred to as an "own home or the like"). The telework site is a satellite office or a home of an employee of the company, which is the customer. The information terminal 50 is used by the employee (hereinafter also referred to as "teleworker") who works at the own home or the like to instruct the second printing device 60 to perform printing.

As illustrated in FIG. 1, the management terminal 80 includes an input unit 81 and a display unit 82. An administrator of the company can operate the management terminal 80 to access various types of information stored in the first printing device 11. The management terminal 80 instructs the first printing device 11 for which the subscription contract has been made to allocate, to the second printing device 60, a second number of printable media that is a part of a first number of printable media provided to the first printing device 11 for a monthly fee. The first printing device 11 accepts the instruction and allocates the number of printable media by rewriting medium number management information PI stored in a storage unit 34. The medium number management information PI is described later. The result of the allocation may be transmitted from the first printing device 11 to the service provider server 90 via the network NW. The management terminal 80 may be configured to access the service provider server 90 to operate the input unit 81 and allocate a part of the first number of printable media of the first printing device 11 as the second number of printable media to the second printing device 60 via the service provider server 90. In addition, the terminal device 80 performs authentication using an ID and a password to access the first printing device 11 or the management terminal 80.

Configuration of First Printing Device 11

Figure 2:
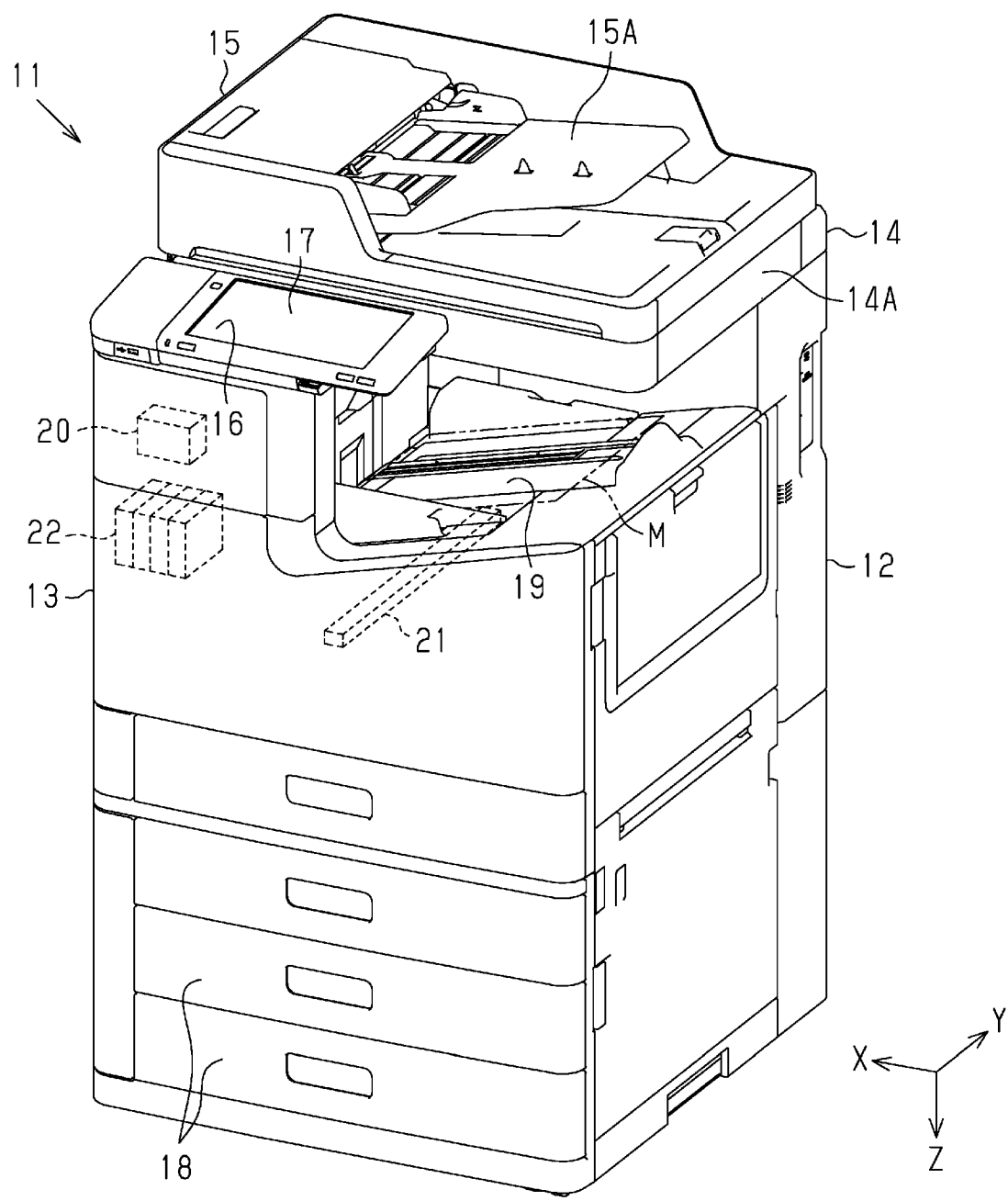
FIG. 2 is a perspective view illustrating a first printing device.

Next, a detailed configuration of the first printing device 11 is described. In FIG. 2, the first printing device 11 is placed on a horizontal flat surface, the direction of gravity is indicated by a Z axis, and directions along which the horizontal flat surface extend are indicated by an X axis and a Y axis. The X axis, the Y axis, and the Z axis are orthogonal to each other. In FIG. 2, a direction parallel to the X axis is a width direction X, a direction parallel to the Y axis is a depth direction Y, and a direction parallel to the Z axis is a vertical direction Z.

As illustrated in FIG. 2, the first printing device 11 is, for example, a multifunction device. The first printing device 11 has a scanner function of reading a document, a copy function of copying and printing a document, and a printing function of printing a character or an image on the medium M.

As illustrated in FIG. 2, the first printing device 11 includes a rectangular parallelepiped main body 12. The first printing device 11 includes a printing unit 13 constituted by an almost entire part of the main body 12, and an image reader 14 disposed on the upper side of the printing unit 13. The image reader 14 reads an image of a document (not illustrated). The first printing device 11 includes an automatic document feeder 15 that transports the document.

The automatic document feeder 15 feeds the document mounted on a document tray 15A. The image reader 14 has a feeding type reading function of reading the document fed by the automatic document feeder 15 and a flat bed type reading function of reading the document set on a document stage 14A.

In addition, the first printing device 11 includes an input unit 16 and a display unit 17. A user can operate the input unit 16 to give an instruction to the first printing device 11. The display unit 17 may be constituted by a touch panel, for example. In this case, the input unit 16 may be constituted by an operation function of the touch panel. The input unit 16 may be constituted by a mechanical switch.

As illustrated in FIG. 2, the first printing device 11 includes a print head 21 that performs printing on the medium M, and a controller 20 that controls the print head 21. The print head 21 is, for example, a liquid ejecting head that ejects a liquid that is an example of a printing agent and is ink or the like. The controller 20 comprehensively controls the first printing device 11. The controller 20 controls the print head 21, the image reader 14, the automatic document feeder 15, the display unit 17, and the like.

The first printing device 11 includes liquid cartridges 22 detachably attached to the first printing device 11. Each of the liquid cartridges 22 stores a liquid such as ink. The number of liquid cartridges 22 included in the first printing device 11 is the same as the number of colors to be printed by the print head 21. The plurality of liquid cartridges 22 stores liquids of the colors. Liquid tanks such as ink tanks may be provided instead of the liquid cartridges 22.

The print head 21 constitutes a part of the printing unit 13. The printing unit 13 includes a media storage unit 18, which has cassettes that are disposed at multiple stages or the like and in which media M such as paper sheets are stored, a transport unit 23 (see FIG. 5) that transports the media M stored in the media storage unit 18 one by one, and a discharge tray 19 onto which the media M printed by the print head 21 are discharged. The print head 21 performs printing on the medium M by ejecting a liquid, such as ink, supplied from each of the liquid cartridges 22 onto the medium M.

The printing unit 13 illustrated in FIG. 2 is of a line recording type in which the print head 21 is constituted by a line head. The printing unit 13 is not limited to the line recording type. The printing unit 13 may be of a serial recording type in which the print head 21 can reciprocate in the width direction of the medium M.

The controller 20 according to the embodiment manages the number of media printed. That is, the first printing device 11 manages the number of media printed by performing printing including copy printing. The first printing device 11 can print the number of media specified in the subscription contract for the monthly fee, for example.

Configuration of Second Printing Device 60

Figure 3:
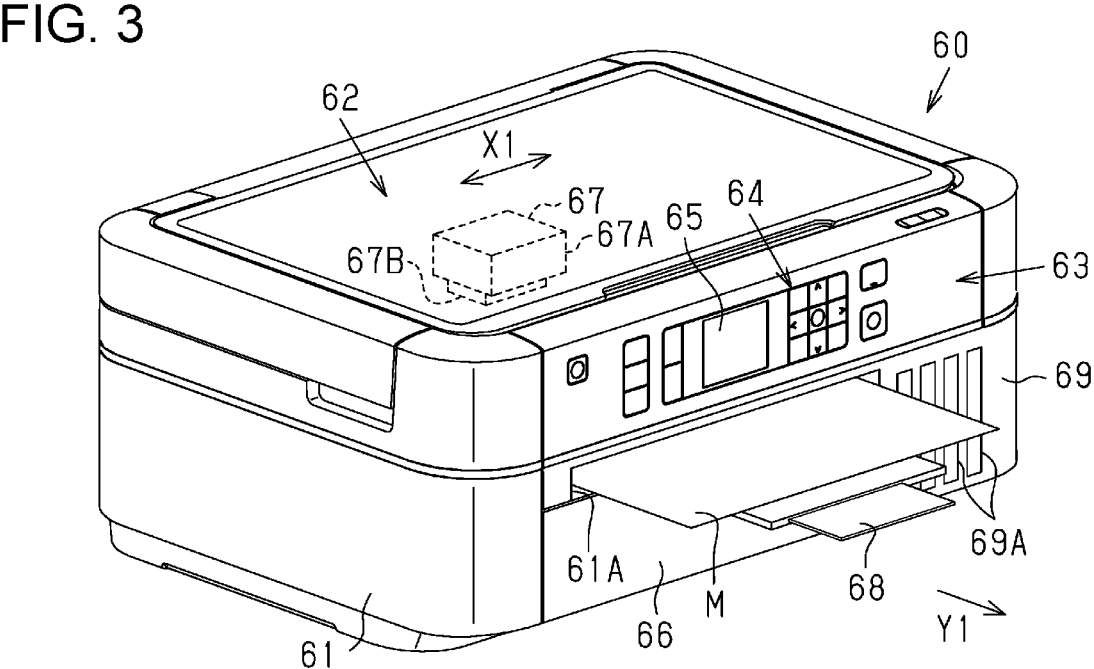
FIG. 3 is a perspective view illustrating a second printing device.

As illustrated in FIG. 3, the second printing device 60 includes a substantially cubic box-shaped main body 61. The second printing device 60 includes an image reader 62 on the upper side of the main body 61. The second printing device 60 includes an openable and closable cover 63 on the upper side of the main body 61. The image reader 62 is opened and closed together with the cover 63. The cover 63 is closed at a closing position illustrated in FIG. 3 and is opened at an opening position where the inside of the main body 61 is exposed.

The second printing device 60 includes an operation unit 64 and a display unit 65. The operation unit 64 is configured to be operatable by a user. The display unit 65 displays various images. The display unit 65 displays, for example, a menu screen, various types of message information, and the like.

The second printing device 60 includes a medium feeding cassette 66. The medium feeding cassette 66 is disposed at a lower portion of the main body 61. The medium feeding cassette 66 is attached to the main body 61 in a state in which the medium feeding cassette 66 can be inserted in and removed from the main body 61. The medium feeding cassette 66 is configured to be able to store a plurality of media M such as paper sheets. The second printing device 60 performs printing on each of the media M fed from the medium feeding cassette 66.

The second printing device 60 includes a second printing unit 67. The second printing unit 67 uses a printing agent such as ink to perform printing on a medium M. The second printing unit 67 includes a movable carriage 67A and a print head 67B disposed at a lower portion of the carriage 67A. While the carriage 67A reciprocates in a width direction X1 intersecting a transport direction Y1 of the medium M, the print head 67B performs printing on the medium M.

The second printing device 60 includes a discharge port 61A. The discharge port 61A is open on a front surface of the main body 61. The discharge port 61A discharges the medium M after the printing. The second printing device 60 includes a discharge tray 68. The discharge tray 68 is disposed on the front surface of the main body 61 such that the discharge tray 68 is slidable. The discharge tray 68 holds the medium M discharged from the discharge port 61A after the printing.

In addition, the second printing device 60 includes a liquid storage unit 69. The liquid storage unit 69 includes a plurality of storage units 69A that store a liquid that is an example of the printing agent and is ink or the like. The liquid storage unit 69 described in this example includes the same number of storage units 69A as the number of colors that the second printing unit 67 can print on the medium M. In the plurality of storage units 69A, liquids of the colors that are ink or the like are individually stored. The main body 61 has, on a front surface of the liquid storage unit 69, a plurality of window portions through which the user can visually recognize the amounts of the liquids stored in the storage units 69A.

Figure 4:
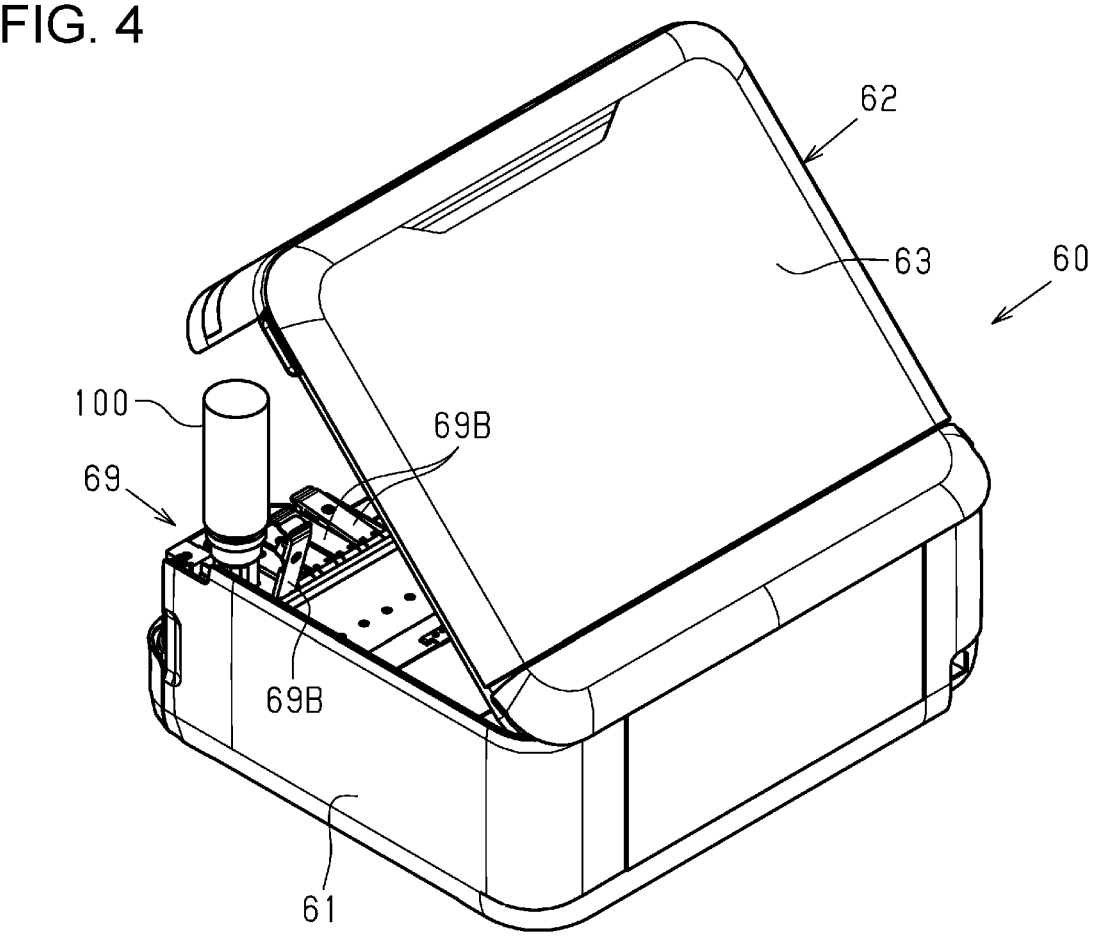
FIG. 4 is a perspective view illustrating the second printing device as viewed from the back surface side of the second printing device.

As illustrated in FIG. 4, in a state in which the cover 63 is opened, the liquid storage unit 69 disposed in the main body 61 is exposed. The liquid storage unit 69 includes openable and closable caps 69B for each of the storage units 69A (see FIG. 3). When the amount of a liquid stored in each of the storage units 69A becomes small, the user opens each of the caps 69B and inserts a supply portion (not illustrated) of a liquid bottle 100 into a supply port (not illustrated) of the storage unit 69A to refill the storage unit 69A with a liquid such as ink from the liquid bottle 100.

When the printing agent that is to be supplied to the print head 67B and is ink or the like is used up in the second printing device 60, the user supplies a printing agent to the second printing device 60. When a liquid supply source is a liquid tank, a liquid that is an example of the printing agent and is ink or the like is supplied from the liquid bottle 100. When the second printing device 60 is a printing device in which a liquid supply source is a liquid cartridge such as an ink cartridge, the user replaces the liquid cartridge attached to the second printing device 60 with another liquid cartridge. Therefore, before the second printing device 60 uses up the liquid, it is necessary to provide a new liquid bottle 100 or a new liquid cartridge to the user, for example.

The same applies to the first printing device 11. Before the first printing device 11 uses up a liquid, it is necessary for the company or an employee to prepare a new liquid cartridge 22, for example.

According to the subscription contract, a liquid supply source such as a liquid cartridge 22 is delivered to the user before the first printing device 11 uses up the liquid. The service company with which the subscription contract has been made delivers this liquid supply source. For the service company, the company that rents the first printing device 11 is a counterparty with which the service company has made the subscription contract. The service company manages the service provider server 90 of the company that is the counterparty with which the service company has made the subscription contract.

The service provider server 90 collects, via the network NW, information on the amount of a printing agent, such as ink, consumed by the first printing device 11. The service provider server 90 manages, based on the information, the number of new liquid supply sources owned by the company that uses the first printing device 11 or owned by the user who uses the first printing device 11.

The service company delivers a liquid storage body such as a new liquid cartridge 22 to the company based on the information collected via the service provider server 90 before the first printing device 11 for which the subscription contract has been made uses up a liquid. In addition, when a part of the first number of printable media of the first printing device 11 is allocated as the second number of printable media to the second printing device 60, a liquid supply source such as a new liquid bottle 100 is delivered to the user of the second printing device 60 at the time of the next delivery. That is, before a liquid in the amount of a single liquid bottle 100 is completely consumed to print a second number of printed media that is the number of media printed among the second number of printable media, the service company delivers a liquid supply source such as a new liquid bottle 100 to the user of the second printing device 60. When the liquid supply source of the second printing device 60 is a liquid cartridge such as an ink cartridge, the service company delivers a liquid cartridge as the liquid supply source to the user of the second printing device 60.

Electrical Configuration of Printing System

Next, an electrical configuration of the printing system 10 is described with reference to FIG. 5.

The first printing device 11 includes the controller 20, the input unit 16, the display unit 17, the image reader 14, and the printing unit 13. The printing unit 13 includes the print head 21, the transport unit 23, and a maintenance unit 24. The maintenance unit 24 includes a pump 25. The first printing device 11 includes a communication unit 26. The controller 20 is connected to the network NW via the communication unit 26.

Figure 5:
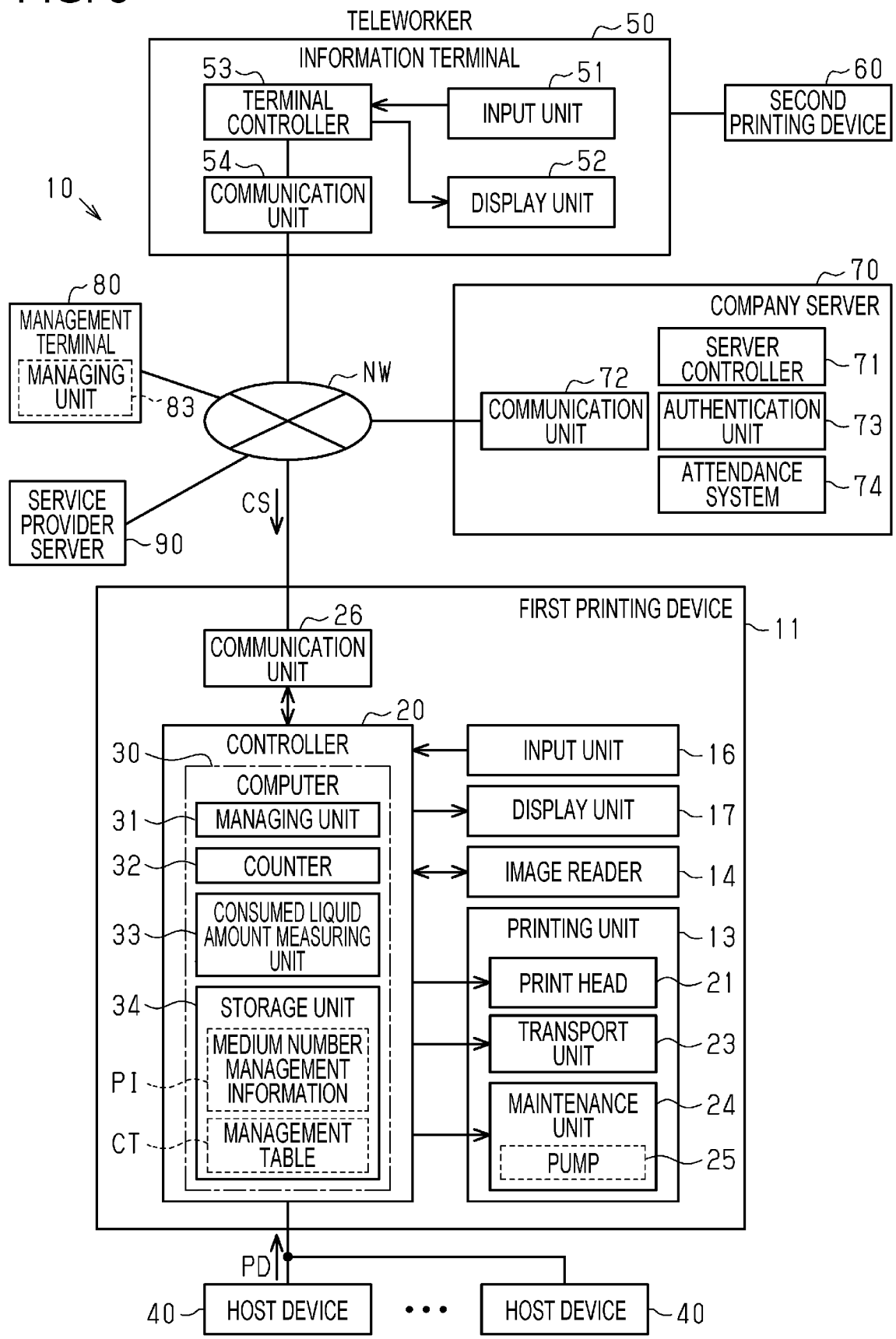
FIG. 5 is a block diagram illustrating the printing system.

As illustrated in FIG. 5, the first printing device 11 is connected to the plurality of host devices 40 via a LAN such as the in-house local area network (in-house LAN). A user (for example, an employee) causes a host device 40 to give a print instruction. In this case, print data PD is transmitted from the host device 40 to the first printing device 11. The print data PD is data including print image data including a character to be printed or an image to be printed, and printing condition information specified by the user. When the first printing device 11 receives the print data PD from the host device 40, the controller 20 controls the printing unit 13 to cause the printing unit 13 to print the character, the image, or the like on the medium M based on the print data PD.

As illustrated in FIG. 5, the information terminal 50 of the teleworker includes an input unit 51, a display unit 52, a terminal controller 53, and a communication unit 54. The terminal controller 53 comprehensively controls the information terminal 50. In addition, the terminal controller 53 is connected to the network NW via the communication unit 54.

In addition, the company server 70 illustrated in FIG. 5 includes a server controller 71, a communication unit 72, and an authentication unit 73. The server controller 71 comprehensively controls the company server 70. In addition, the server controller 71 is connected to the network NW via the communication unit 72. When the management terminal 80 accesses the first printing device 11, the authentication unit 73 performs authentication on the management terminal 80. The administrator enters an ID and a password to access the first printing device 11 from the management terminal 80. The authentication unit 73 performs the authentication using the ID and the password received from the management terminal 80. The server controller 71 permits the access to the first printing device 11 for the authenticated management terminal 80.

The access from the management terminal 80 allows the controller 20 of the first printing device 11 to allocate a part of printable media among the specified number of media managed in the medium number management information PI to the second printing device 60, which is the other printing device. The controller 20 performs the allocation process based on an instruction from the management terminal 80. The management terminal 80 may include a managing unit 83 having the same function as that of a managing unit 31 included in the controller 20 of the first printing device 11, instead of or in addition to the managing unit 31. The managing units 31 and 83 manage the medium number management information PI (see FIG. 7 and the like).

Next, the configuration of the first printing device 11 is described in detail. The user operates the input unit 16 to select one of printing, scanning, and copying from a menu screen of the display unit 17. Based on the selected content, details displayed on the display unit 17 are changed from the menu screen to a setting screen (not illustrated) on which a predetermined condition such as a printing condition, a scanning condition, a copying condition, or the like can be entered. In addition, the user selects a desired condition among the conditions on the setting screen to instruct the first printing device 11 to perform any one of the printing, the scanning, and the copying. The first printing device 11 performs the instructed one of the printing, the scanning, and the copying based on the condition entered by the user.

In addition, when the administrator of the company operates the input unit 16 to enter the ID and the password and is authenticated, the administrator of the company can access the medium number management information PI stored in the storage unit 34 of the first printing device 11. In addition, the administrator can operate the management terminal 80 to access the medium number management information PI stored in the storage unit 34 of the first printing device 11. The administrator accesses the medium number management information PI to allocate the number of printable media to the second printing device 60.

The image reader 14 is controlled by the controller 20 to read a document. In addition, the printing unit 13 is controlled by the controller 20 to cause the print head 21 to eject a liquid onto the medium M transported by the transport unit 23 so as to print a character, an image, or the like on the medium M. For example, upon accepting a copy instruction, the controller 20 performs copying by causing the image reader 14 to read a document and causing the printing unit 13 to print an image of the read document on the medium M.

The maintenance unit 24 is controlled by the controller 20 to maintain the print head 21 when a maintenance period starts. The maintenance includes flushing (idle ejection) of ejecting droplets onto a predetermined location other than the medium M from all nozzles of the print head 21, and cleaning of forcibly discharging a liquid from the nozzles of the print head 21. The maintenance unit 24 cleans the print head 21. The maintenance unit 24 includes a cap (not illustrated) that can be moved to a capping position where the cap is in contact with a nozzle surface on which the nozzles of the print head 21 are open, and to a separated position where the cap is separated from the nozzle surface. The maintenance unit 24 drives the pump 25 to forcibly discharge a liquid from the nozzles in a state in which the cap is in contact with the nozzle surface of the print head 21.

The pump 25 may be a suction pump communicating with the cap. Alternatively, the pump 25 may be a pressurizing pump that pressurizes a liquid within a flow path communicating with the nozzles of the print head 21 from the side from which the liquid flows. When the pump 25 is the suction pump, a closed space communicating with the nozzles is formed by the nozzle surface and the cap at the capping position where the cap is in contact with the nozzle surface. In this state, when the pump 25 is driven, the closed space communicating with the nozzles is negatively pressurized and the liquid is forcibly suctioned and discharged from the nozzles. In addition, when the pump 25 is the pressurizing pump and is driven, the liquid within the flow path communicating with the nozzles is pressurized from the side from which the liquid flows, and is forcibly discharged from the nozzles. In this case, the cap may be slightly separated from the nozzle surface.

The controller 20 includes a computer 30. The computer 30 is, for example, constituted by a microprocessor. The computer 30 includes the managing unit 31, counters 32, a consumed liquid amount measuring unit 33, and the storage unit 34.

By executing a program (not illustrated) stored in the storage unit 34 by the computer 30, at least one of the managing unit 31, the counters 32, and the consumed liquid amount measuring unit 33 may be configured by software. Alternatively, at least one of the managing unit 31, the counters 32, and the consumed liquid amount measuring unit 33 may be constituted by hardware.

Each of the counters 32 counts the number of media. The plurality of counters 32 is provided. The controller 20 causes the plurality of counters 32 to count the number of media printed by the first printing device 11 and the number of media printed by the second printing device 60. The values counted by the counters 32 indicate the numbers of printed media.

The consumed liquid amount measuring unit 33 measures the amount of a liquid consumed per medium by summing amounts of droplets counted by color counters for each ink color based on print image data included in the print data PD and provided for one medium (one page).

The controller 20 causes the consumed liquid amount measuring unit 33 to measure the amount (amount of ink consumed) of a liquid consumed per medium based on the print data PD. The consumed liquid amount measuring unit 33 measures a consumed liquid amount that is the amount of a liquid (ink) consumed to print one medium. The consumed liquid amount measuring unit 33 measures a consumed liquid amount that is the amount of a liquid (ink) consumed for a recovery operation such as maintenance. For example, the consumed liquid amount measuring unit 33 includes the plurality of color counters that count the number of droplets for each of the ink colors based on print image data constituting a part of the print data PD and provided for each of the colors. For example, the print head 21 may be configured to be able to separately eject droplets based on a plurality of dot sizes and form dots with a plurality of gradations. In this case, the color counters may be configured to count the number of dots for each of the dot sizes.

The medium number management information PI and a management table CT are stored in the storage unit 34. The computer 30 controls the first printing device 11 and manages the medium number management information PI.

Figure 7:
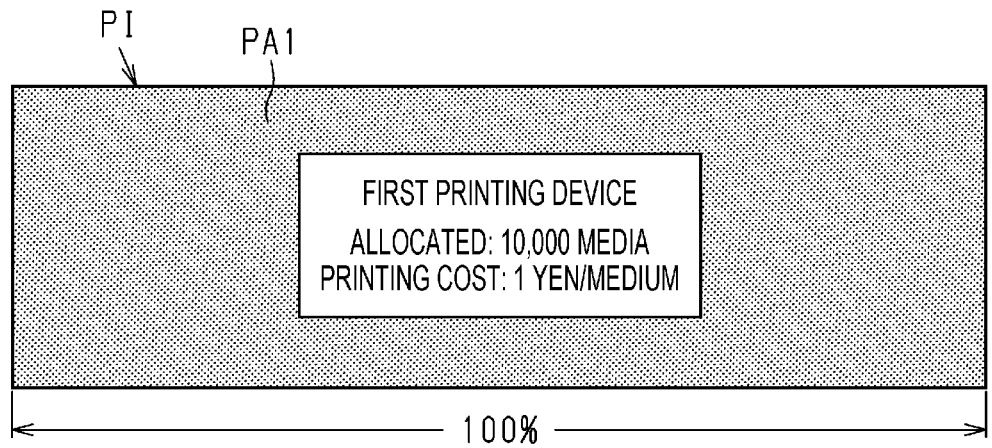
FIG. 7 is a schematic diagram describing a process by an allocator.

The printing system 10 according to the embodiment includes the input unit 16 (see FIG. 5) of the first printing device 11 and the input unit 81 (see FIG. 1) of the management terminal 80 as units that change the medium number management information PI illustrated in FIG. 7. The administrator can operate the input unit 16 of the first printing device 11 to access the medium number management information PI stored in the storage unit 34 and allocate the number of printable media. In addition, the administrator can operate the input unit 81 of the management terminal 80 to remotely access the medium number management information PI stored in the storage unit 34 of the first printing device 11 and allocate the number of printable media. In the embodiment, a part of the number of printable media of the first printing device 11 can be allocated to the second printing device 60.

The controller 20 can accept a command CS to change the medium number management information PI from the management terminal 80 or the input unit 16. Upon accepting the command CS to change the allocation, the controller 20 changes the value of the first number of printable media, which is the number of printable media of the first printing device 11, and the value of the second number of printable media, which is the number of printable media of the second printing device 60, to values specified in the command CS in the medium number management information PI.

The controller 20 manages the number of printed media corresponding to each range of the amount of a liquid consumed per medium in the printing performed by ejecting the liquid from the print head 21 onto the medium M. The liquid described in this example is, for example, ink. That is, the controller 20 manages the number of media printed in the printing performed by ejecting the ink from the print head 21. Specifically, the controller 20 accesses the medium number management information PI (see FIG. 7 and the like) stored in the storage unit 34 and subtracts the number of printed media from the number of printable media to update the number of printable media. In this case, the number of printable media is the number of remaining printable media that is calculated by subtracting the number of media printed in a current month from the specified number of media that can be printed for the monthly fee. Therefore, the number of printable media is sequentially updated.

The medium number management information PI includes the specified number of media that is the maximum number of media that can be printed by the first printing device 11 for the monthly fee, the number of printed media, and the number of printable media that is calculated by subtracting the number of printed media from the specified number of media. In the embodiment, the medium number management information PI also includes the number of printable media allocated to the second printing device 60.

The medium number management information PI may be information to be used to manage the number of printed media corresponding to each range of the amount (for example, the amount of ink consumed) of a liquid consumed per medium. The medium number management information PI may indicate that a fee (unit price) per medium varies for each range of the amount of a liquid consumed per medium. In this case, the controller 20 causes the consumed liquid amount measuring unit 33 to measure the amount of a liquid consumed per medium. The controller 20 identifies a range based on the measured amount of the liquid consumed per medium and causes each of the counters 32 to count up the number of printed media in the identified range. For example, the amount of the liquid consumed per medium is classified into any of three ranges, a low range, a middle range, and a high range. When a unit price for the low range is A yen per medium, a unit price for the middle range is B yen per medium, and a unit price for the high range is C yen per medium, the relationship of A<B<C is established. The specified number of media is set based on a monthly billing amount. Even in such a flat-rate printing service, when a teleworker does not use the first printing device 11 to perform printing, the printing cost may be high for the monthly billing amount. Therefore, it is possible to reduce the high printing cost by allocating a part of the first number of printable media of the first printing device 11 as the second number of printable media to the second printing device 60. The specified number of media is an upper limit on the number of media specified for each month. It may be possible to allocate a part of the number of printable media from the first printing device 11 to the second printing device 60 based on the medium number management information PI. The number of ranges is not limited to three and may be two or four or more.

Configurations of Managing Units

Configurations of the managing units 31 and 83 are described with reference to FIG. 6. Since the managing units 31 and 83 basically have the same configuration, the managing unit 31 is described below.

Figure 6:
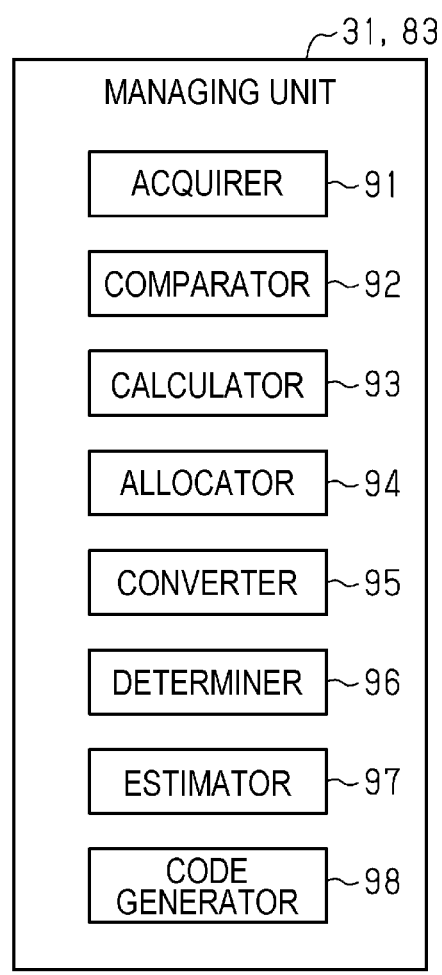
FIG. 6 is a block diagram illustrating a managing unit.

As illustrated in FIG. 6, the managing unit 31 includes an acquirer 91, a comparator 92, a calculator 93, an allocator 94, a converter 95, a determiner 96, an estimator 97, and a code generator 98.

The acquirer 91 acquires the number of media printed by the first printing device 11 installed at the first location. The acquired number of printed media is the number of media already printed by the first printing device 11.

The comparator 92 compares the number of printed media acquired by the acquirer 91 with the number of media specified based on the billing amount. The specified number of media is the upper limit on the number of media specified for each month.

The calculator 93 calculates the first number of printable media of the first printing device 11 based on the comparison by the comparator 92.

The allocator 94 allocates a part of the first number of printable media calculated by the calculator 93 as the second number of printable media to the second printing device 60 installed at the second location. The second printing device 60 performs printing based on the second number of printable media.

The second number of printable media allocated from the first number of printable media may be transmitted to the second printing device via a server. In this case, the server may be the company server 70 or the service provider server 90.

In addition, the second number of printable media may be transmitted to the second printing device 60 via a USB memory 57 (see FIG. 15), a QR code (registered trademark), or the like. When the QR code is used, the second printing device 60 reads the QR code printed by the first printing device 11 so as to load the allocated second number of printable media in the second printing device 60.

In addition, as illustrated in FIG. 6, the managing unit 31 may include the converter 95 that performs conversion between the first number of printable media and the second number of printable media before at least a part of the first number of printable media is allocated as the second number of printable media. The converter 95 performs the conversion between the first number of printable media and the second number of printable media based on printing information of the first printing device 11 and printing information of the second printing device 60. As the printing information, a cost of printing per medium may be used.

In addition, as illustrated in FIG. 6, the managing unit 31 may include the determiner 96 that determines whether a medium to be printed by the second printing device 60 is a medium for business use or a medium for private use. When the medium determined by the determiner 96 as the medium for business use is printed, the calculator 93 subtracts only the number of media printed for business use from the second number of printable media. When the medium determined by the determiner 96 as the medium for private use is printed, the calculator 93 does not subtract the number of media printed for private use from the second number of printable media.

In addition, as illustrated in FIG. 6, the managing unit 31 may include the estimator 97 that estimates the amount of the printing agent used by the second printing device 60 based on the number of media printed by the second printing device 60 for business use. When the amount of the used printing agent estimated by the estimator 97 reaches a predetermined value, a request to provide a printing agent for the amount of the printing agent used is given. In this case, the predetermined value is the amount of a printing agent that fills one bottle or one cartridge.

The second printing device 60 is an ink jet printing device that performs printing by ejecting ink. When it is determined that the recovery operation performed by the second printing device 60 relates to a medium for business use, the amount of the printing agent used for the recovery operation is added to the amount of the printing agent used. In this case, the recovery operation includes cleaning that is an operation of unclogging one or more clogged nozzles among the nozzles of the print head 21. The recovery operation in which the amount of the printing agent is added to the amount of the printing agent used may be only the cleaning operation or may be both the cleaning operation and the flushing operation. The recovery operation in which the amount of the printing agent is added to the amount of the printing agent used may be only the flushing operation.

The allocator 94 can allocate at least a part of the second number of printable media as the first number of printable media to the first printing device 11. When it is determined that the first number of printable media is equal to or smaller than a predetermined value, the allocator 94 allocates the second number of printable media as the first number of printable media to the first printing device 11. That is, the allocator 94 allocates at least a part of the second number of printable media as the first number of printable media to the first printing device 11, thereby returning at least the part of the second number of printable media as the first number of printable media to the first printing device 11.

The printing system 10 includes the code generator 98 that generates the second number of printable media as a code, and the image reader 62 that is included in the second printing device 60 and is an example of a reader that reads the code. The second number of printable media is set in the second printing device 60 by reading the code by the image reader 62. In the embodiment, although the image reader 62 of the second printing device 60 is an example of the reader, the second printing device 60 may include a code reader. In addition, the reader may be a code reader that is connected as an external device to the second printing device 60.

The code includes device information of the second printing device 60. When the image reader 62 reads the code and the device information does not match the second printing device 60, the second number of printable media is not set in the second printing device 60. In this case, the device information may indicate the type of the device, the serial number of the device, or the like.

As illustrated in FIG. 7, the medium number management information PI includes the number of media specified based on the monthly fee. In the example illustrated in FIG. 7, the specified number of media is illustrated as 100%. In the example illustrated in FIG. 7, "10,000 media" are allocated as the specified number of media that is the maximum number of printable media specified based on the monthly fee. Since the first printing device 11 is an office printer, the printing cost of the first printing device 11 is 1 yen per medium. In FIG. 7, a first printable region PA1 corresponds to the specified number of media.

Figure 8:
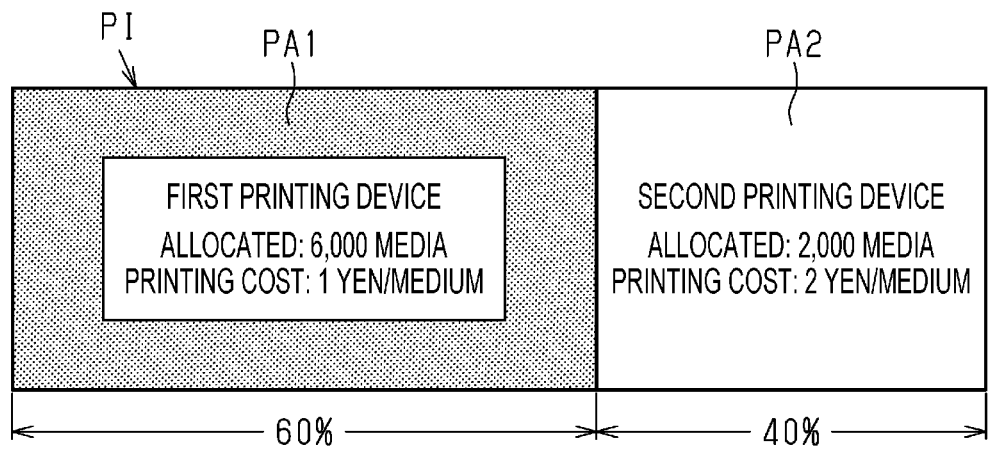
FIG. 8 is a schematic diagram describing a process by the allocator.

As indicated by the medium number management information PI illustrated in FIG. 8, the allocator 94 allocates 4,000 media among the specified number of media of the first printing device 11 to the second printing device 60. Since the second printing device 60 is a home printer, the printing cost of the second printing device 60 is 2 yen per medium. Therefore, 4,000 media to be printed by the first printing device 11 correspond to 2,000 media to be printed by the second printing device 60. As indicated by the medium number management information PI illustrated in FIG. 8, 6,000 media are allocated to the first printing device 11 and 2,000 media are allocated to the second printing device 60. That is, when 10,000 media that are the specified number of media are 100%, 60% is allocated to the first printing device 11 and 40% is allocated to the second printing device 60. In FIG. 8, the first printable region PA1 corresponds to 60% and a second printable region PA2 corresponds to 40%.

Figure 9:
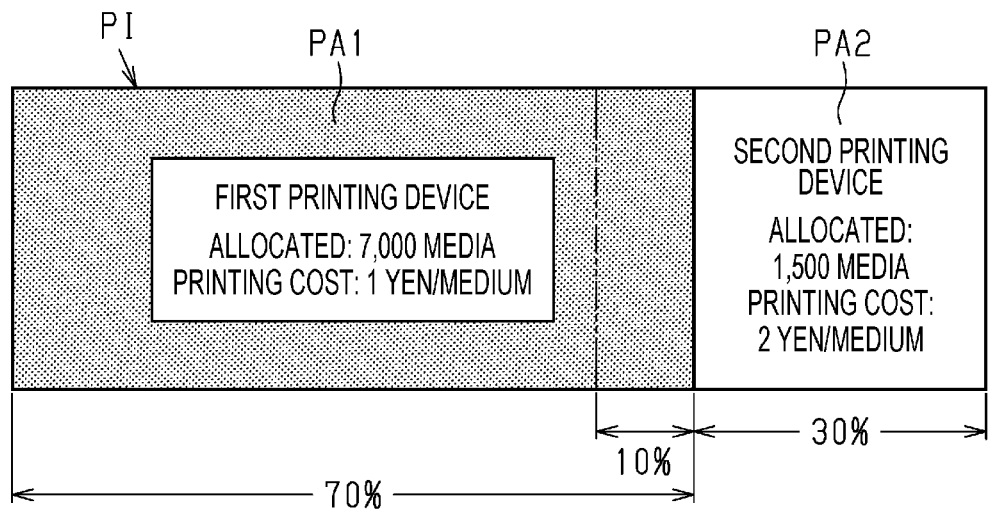
FIG. 9 is a schematic diagram describing a process by the allocator.

As illustrated in FIG. 9, according to the medium number management information PI, a part of 2,000 media allocated to the second printing device 60 can be allocated as the number of printable media of the first printing device 11. That is, in the embodiment, all or a part of the number of printable media allocated to the second printing device 60 can be returned to the first printing device 11. In FIG. 9, the first printable region PA1 increases by 10% from 60% to 70% and the second printable region PA2 decreases by 10% from 40% to 30%.

Figure 10:
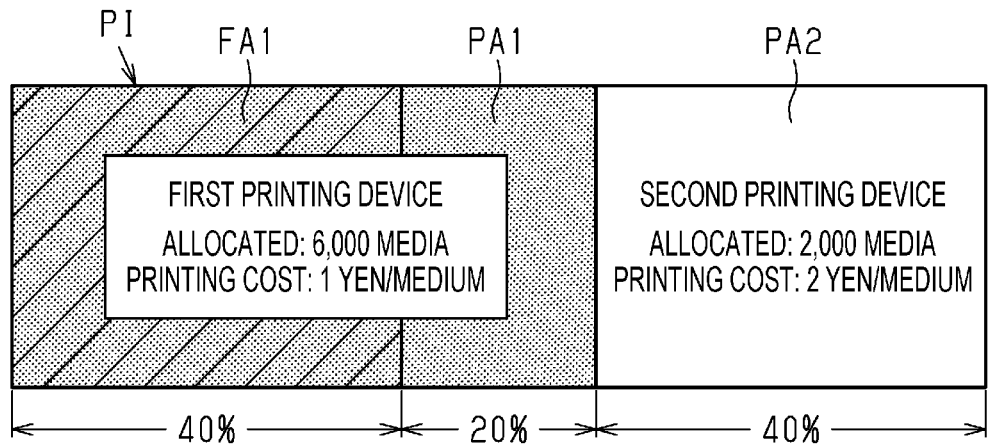
FIG. 10 is a schematic diagram describing a process by the allocator.

In addition, as illustrated in FIG. 10, the allocator 94 may be configured to allocate, as the first number of printable media, at least a part of the second number of printable media of the second printing device 60 to the first printing device 11 when the number of printable media of the first printing device 11 is equal to or smaller than the predetermined value.

Figure 11:
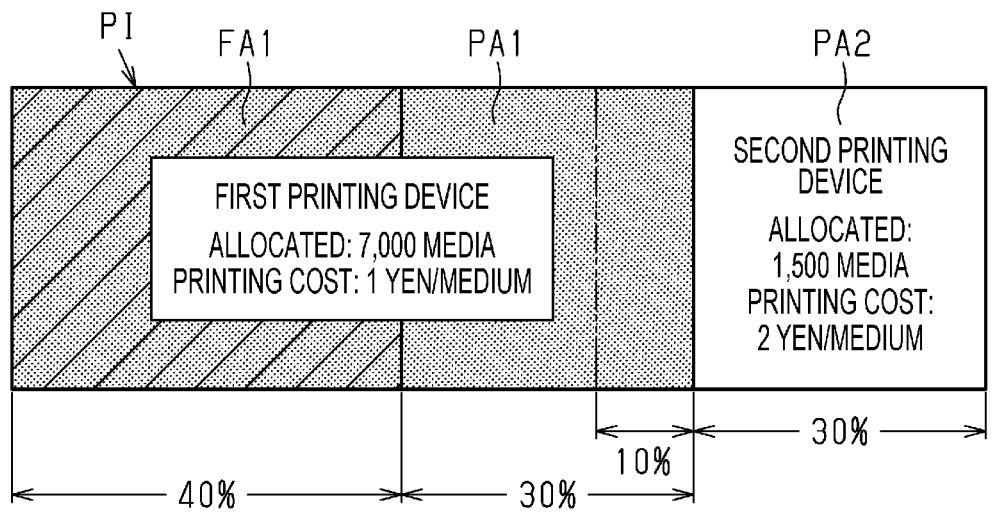
FIG. 11 is a schematic diagram describing a process by the allocator.

As illustrated in FIG. 10, it is assumed that after a part of the first number of printable media is allocated as the second number of printable media to the second printing device 60, a first number of printed media that is the number of printed media increases as indicated by the first printed region FA1 illustrated in FIG. 10. In this case, the first number (region PA1) of printable media of the first printing device 11 becomes equal to or smaller than the predetermined value. After that, the allocator 94 allocates a part of the second number (region PA2) of printable media of the second printing device 60 as the first number of printable media to the first printing device 11. That is, the allocator 94 returns a part of the second number of printable media of the second printing device 60 as the first number of printable media to the first printing device 11. In FIG. 11, the first number (region PA1) of printable media increases by 10% from 20% to 30% and the second number (region PA2) of printable media decreases by 10% from 40% to 30%.

Figure 12:
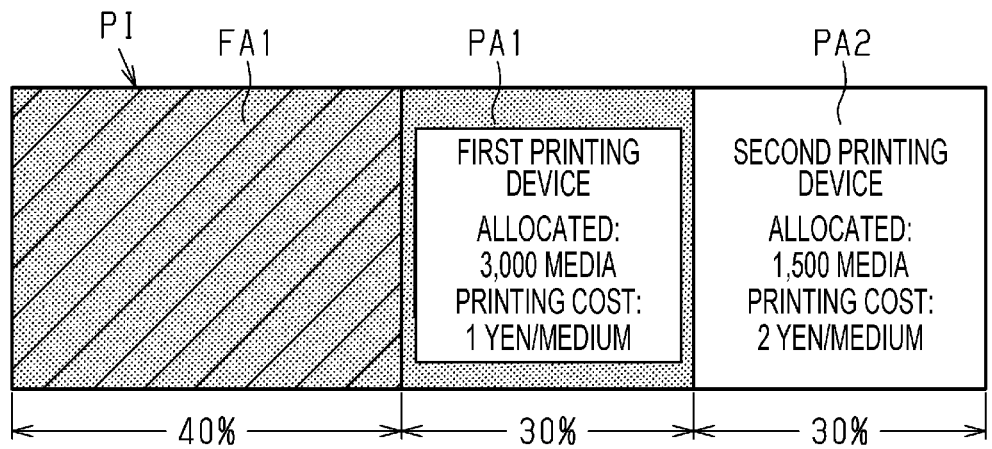
FIG. 12 is a schematic diagram describing a process by the allocator.

In addition, as illustrated in FIG. 12, when a part of the number of printable media of the first printing device 11 is allocated as the second number of printable media to the second printing device 60, the first number of printed media that is the number of printed media and is indicated in the first printed region FA1 illustrated in FIG. 12 increases to 40%. In this case, the first number of printable media of the first printing device 11 that is indicated in the first printable region PA1 becomes equal to or smaller than the predetermined value. After that, the allocator 94 limits the allocation of the number of printable media from the first printing device 11 to the second printing device 60. Specifically, the allocator 94 sets an upper limit on the allocation from the first printing device 11 to the second printing device 60 to a specified value or less. Therefore, in the example illustrated in FIG. 12, the number of media that is among the first number of printable media of the first printing device 11 and can be allocated to the second printing device 60 is limited to, for example, a number equal to or smaller than half the first number of printable media. Therefore, up to "3,000 media" that are half of "6,000 media" that are the first number of printable media are allocated to the second printing device 60. As a result, 1500 media are allocated as the second number of printable media to the second printing device 60. In FIG. 12, even when 30% is allocated as the second number (region PA2) of printable media, 30% remains as the first number (region PA1) of printable media.

Figures 13, 14:
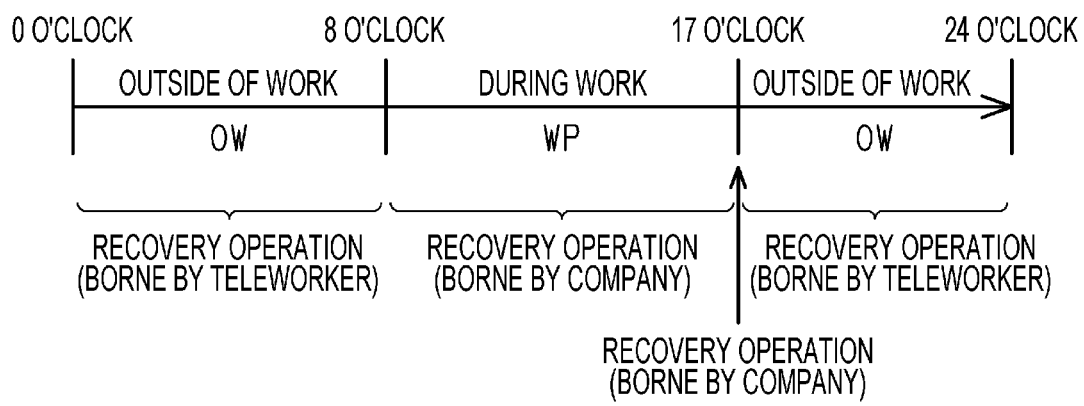
FIG. 13 is a schematic diagram illustrating a management table.
FIG. 14 is an explanatory diagram regarding the bearing of the cost of a liquid consumed for a recovery operation.

The management table CT illustrated in FIG. 13 is stored in the storage unit 34 of the first printing device 11. The management table CT is reference data specifying ON/OFF conditions for the allocation of the number of printable media, the bearing of the cost of the printing agent consumed for the recovery operation, and the storage of the print data PD. The controller 20 references the management table CT to determine whether to turn on or off the allocation of the number of printable media, switch the bearing of the cost of the printing agent consumed for the recovery operation between the company and the teleworker, and turn on or off the storage of the print data PD, based on whether the teleworker is during work or outside of work.

That is, as illustrated in FIG. 13, the controller 20 turns on the allocation of the number of printable media during work and turns off the allocation of the number of printable media outside of work. The company bears the cost of the printing agent consumed for the recovery operation during work, while the teleworker bears the cost of the printing agent consumed for the recovery operation outside of work. In addition, the controller 20 copies the print data PD to the company server 70 when the second printing device 60 performs printing during work. However, the controller 20 does not copy and store the print data PD when the second printing device 60 performs printing outside of work.

For example, as illustrated in FIG. 14, the allocator 94 that constitutes a part of the managing unit 31 determines whether the teleworker is during work WP or outside of work OW based on the attendance system 74. When the recovery operation is performed, the bearing of the cost of the printing agent consumed for the recovery operation is switched between the company and the teleworker based on whether the teleworker is during work WP or outside of work OW. Specifically, when the recovery operation is performed outside of work OW, the cost of the printing agent consumed for the recovery operation is borne by the teleworker. When the recovery operation is performed during work WP, the cost of the printing agent consumed for the recovery operation is borne by the company. In addition, in the embodiment, the second printing device 60 performs the recovery operation at the end of work at the expense of the company. That is, the clogging of a nozzle or the like that is caused by printing during work WP is cleared by performing the recovery operation at the end of work at the expense of the company. Therefore, in a state in which the cause of the nozzle clogging is eliminated by the recovery operation, the bearing of the cost of the printing agent consumed outside of work OW is passed to the user.

Switching Between Private Use and Business Use of Second Printing Device 60

An example of a configuration for switching between private use and business use of the second printing device 60 is described below. For the example of the configuration, the following first to fourth examples are provided. The four examples are described below in order.

Figure 15:
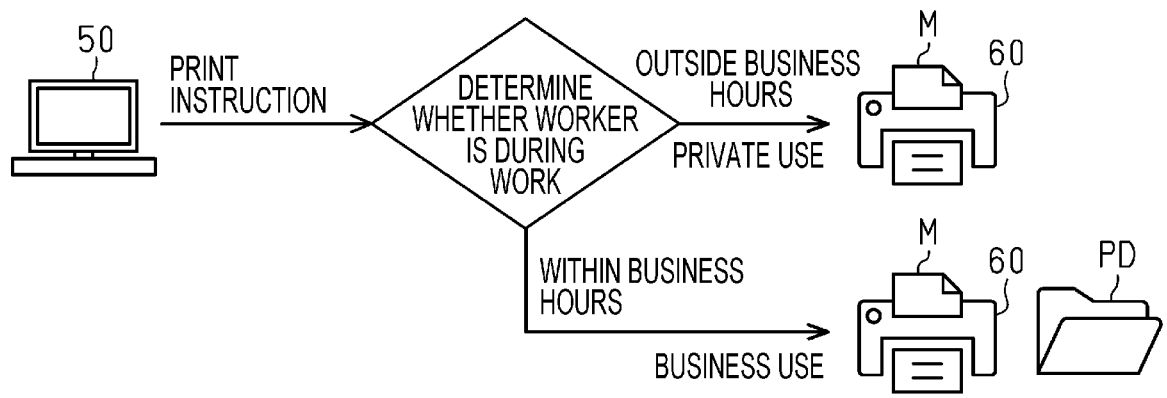
FIG. 15 is a schematic diagram illustrating a first example in which whether private use or business use is determined.

In the first example illustrated in FIG. 15, upon accepting a print instruction from the information terminal 50, the managing unit 31 or 83 determines whether a corresponding teleworker is during work (within business hours). When it is outside the business hours, the second printing device 60 performs printing on the medium M for private use. When it is within the business hours, the second printing device 60 performs printing on the medium M for business use. The managing unit 31 or 83 accesses the attendance system 74 of the company server 70 and determines, based on attendance information of the corresponding teleworker, whether the teleworker is during work or outside of work. In addition, when the second printing device 60 performs printing for business use, the print data PD is copied to the company server 70.

Figure 16:
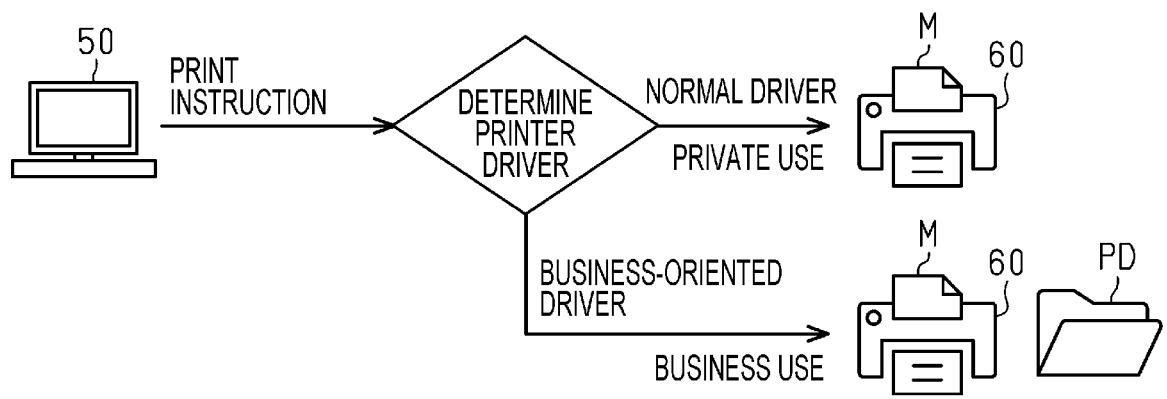
FIG. 16 is a schematic diagram illustrating a second example in which whether private use or business use is determined.

In the second example illustrated in FIG. 16, a normal driver and a business-oriented driver are installed as printer drivers in the information terminal 50. Upon accepting a print instruction from the information terminal 50, the managing unit 31 or 83 determines a printer driver. When the printer driver is the normal driver, the managing unit 31 or 83 determines private use (outside of work). When the printer driver is the business-oriented driver, the managing unit 31 or 83 determines business use (during work). When business use is determined, the print data PD is copied to the company server 70.

Figure 17:
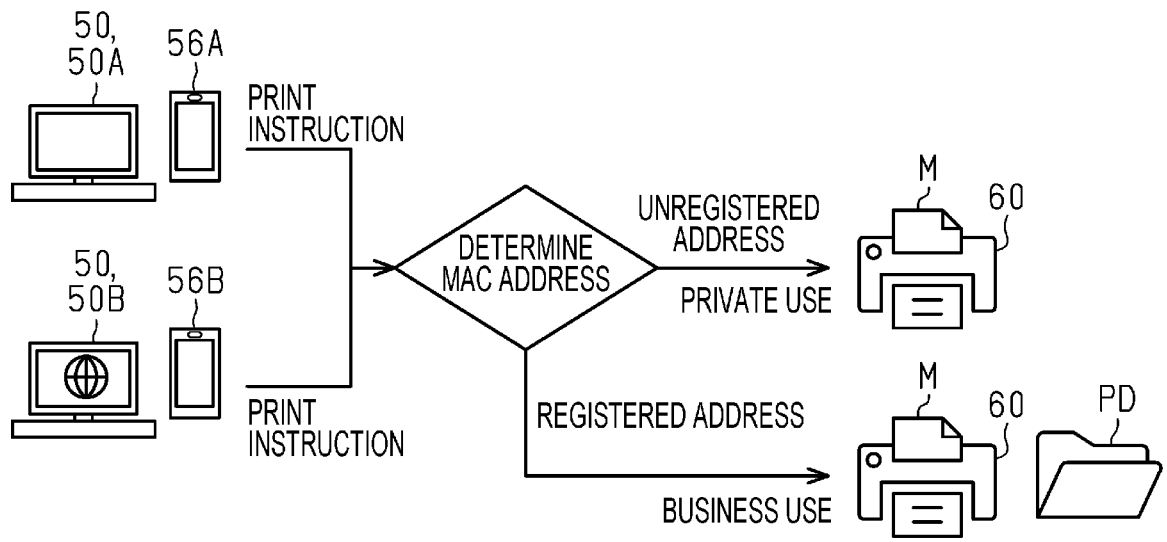
FIG. 17 is a schematic diagram illustrating a third example in which whether private use or business use is determined.

In the third example illustrated in FIG. 17, the teleworker properly uses, at the second location that is the own home or the like, an information terminal 50A personally owned by the teleworker and a company-side information terminal 50B lent or provided by the company. The information terminal 50A personally owned and the company-side information terminal 50B have different MAC addresses. Upon accepting a print instruction from any one of the information terminals 50A and 50B, the managing unit 31 or 83 determines a MAC address. When the MAC address is an unregistered address, the managing unit 31 or 83 determines private use. The second printing device 60 performs printing on the medium M for private use. When the MAC address is a registered address, the managing unit 31 or 83 determines business use. The second printing device 60 performs printing on the medium M for business use. When the printing is performed for business use, the print data PD is copied to the company server 70. In this case, although the information terminals 50A and 50B such as personal computers may be used, mobile information terminals 56A and 56B such as smartphones may be used in addition to the information terminals 50A and 50B or instead of at least one of the information terminals 50A and 50B. Upon accepting a print instruction from the mobile information terminal 56A personally owned or from the company-side information terminal 56B, the managing unit 31 or 83 selects either printing for private use or printing for business use based on the result of determining a MAC address. In this case, the MAC address may not be used and unique information may be used instead of the MAC address.

Figure 18:
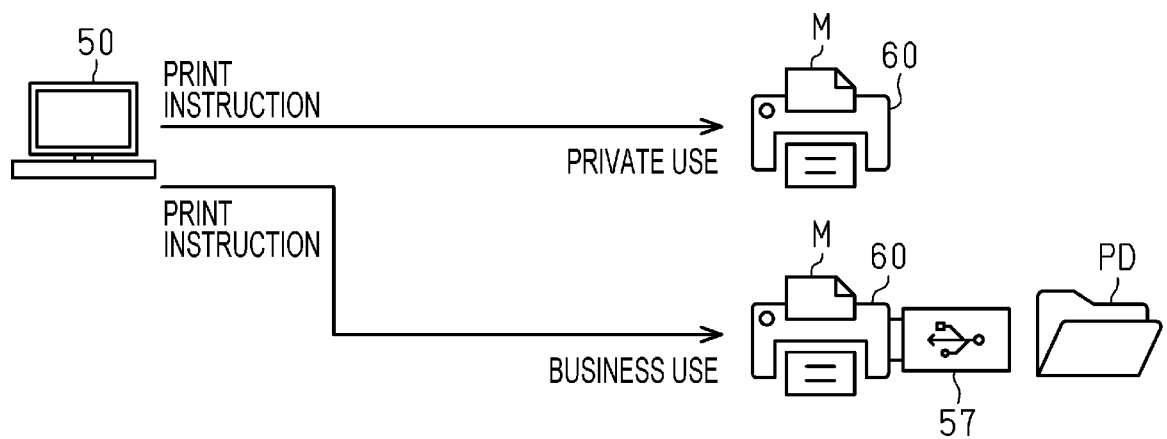
FIG. 18 is a schematic diagram illustrating a fourth example in which whether private use or business use is determined.

In the fourth example illustrated in FIG. 18, to use the second printing device 60 to perform printing for business use, the teleworker connects the USB memory 57 brought back from the company to the second printing device 60. In the USB memory 57, the code relating to the second number of printable media allocated to the second printing device 60 is stored. When a print instruction from the information terminal 50 is accepted, it is possible to perform printing for business use within a range up to the second number of printable media acquired from the code. When the printing is performed for business use, the print data PD is copied to the company server 70.

Effects of Embodiment

Next, effects of the printing system 10 according to the embodiment are described.

In the printing system 10 according to the embodiment, a part of the first number of printable media of the first printing device 11 installed at the office that is the first location can be allocated as the second number of printable media to the second printing device 60 installed at the teleworker's home that is the second location. The allocation is performed by the administrator of the company, for example. Upon accepting an application for the allocation of the number of printable media from the teleworker, the administrator operates the management terminal 80 to access the first printing device 11. In this case, the management terminal 80 may access the first printing device 11 via the service provider server 90 or may directly access the first printing device 11 via the in-house network.

The managing unit 31 of the first printing device 11 or the managing unit 83 of the management terminal 80 allocates a part of the first number of printable media as the second number of printable media to the second printing device 60.

First, the acquirer 91 acquires the number of media printed by the first printing device 11 installed at the first location. For example, as illustrated in FIG. 7, at the beginning of a month, the number of media printed in the month is "0".

Next, the comparator 92 compares the number of printed media acquired by the acquirer 91 with the number of media specified based on the billing amount. For example, as illustrated in FIG. 7, 10,000 media as the number of media specified based on the fixed monthly billing amount are allocated to the first printing device 11.

Next, the calculator 93 calculates the first number of printable media of the first printing device 11 based on the comparison by the comparator 92. For example, since the number of media printed in the month at the beginning of the month is "0", the calculator 93 calculates "10,000 media" as the number of printable media by subtracting the number "0" of printed media from the specified number "10,000" of media. Since the first printing device 11 is an office printer, the printing cost is 1 yen per medium (1 yen/medium).

Next, the allocator 94 allocates at least a part of the first number of printable media calculated by the calculator 93 as the second number of printable media to the second printing device 60 installed at the second location. For example, in the example illustrated in FIG. 8, the number of media corresponding to "4,000 media" corresponding to 40% of the number of printable media that is "10,000 media" is allocated to the second printing device 60. However, since the second printing device 60 is a home printer, the printing cost is 2 yen per medium (2 yen/medium).

Therefore, the converter 95 performs conversion between the first number of printable media and the second number of printable media before at least a part of the first number of printable media is allocated as the second number of printable media. The converter 95 performs the conversion between the first number of printable media and the second number of printable media based on the printing information of the first printing device 11 and the printing information of the second printing device 60. In this case, the printing information is information on the printing cost of the first printing device 11 and the printing cost of the second printing device 60. In this example, as the printing information, a cost of printing per medium is used. Specifically, the printing information is information indicating that the printing cost of the first printing device 11 is 1 yen per medium and that the printing cost of the second printing device 60 is 2 yen per medium. Therefore, the converter 95 calculates "2,000 media" as the second number of printable media by dividing "4,000 media" that are a part of the first number of printable media of the first printing device 11 by "2 yen per medium" that is the unit price per medium and is the printing cost of the second printing device 60. For example, as illustrated in FIG. 8, "4,000 media" that are among the first number of printable media are allocated as "2,000 media" that are the second number of printable media to the second printing device 60. The printing device 60 performs printing based on the second number of printable media.

In addition, after the allocation to the second printing device 60, the allocator 94 can allocate at least a part of the allocated second number of printable media as the first number of printable media to the first printing device 11. That is, it is possible to return at least a part of the second number of printable media allocated to the second printing device 60 as the first number of printable media to the first printing device 11. For example, when it is determined that the first number of printable media is equal to or smaller than the predetermined value, the allocator 94 may allocate the second number of printable media as the first number of printable media to the first printing device 11.

For example, as illustrated in FIG. 10, after the second number of printable media is allocated to the second printing device 60, the first number of printable media of the first printing device 11 becomes equal to or smaller than the predetermined value as a result of an increase in the first number of printed media indicated in the first printed region FA1 illustrated in FIG. 10. After that, the allocator 94 allocates at least a part of the second number of printable media of the second printing device 60 as the first number of printable media to the first printing device 11. That is, when the first number of printable media becomes equal to or smaller than the predetermined value, the allocator 94 returns at least a part of the second number of printable media as the first number of printable media to the first printing device 11. In the example illustrated in FIG. 11, "500 media" among "2,000 media" that are the second number of printable media are allocated as "1,000 media" that are the first number of printable media. As a result, the first number of printable media increases by 10% from 20%, or increases from "2,000 media" to "3,000 media".

In addition, when the printing is progressed in the first printing device 11, the allocator 94 subtracts the first number of printed media that is the number of printed media from the first number of printable media. As a result, when the first number of printable media becomes equal to or smaller than a specified value, the allocator 94 may limit the number of media to be allocated that is at least a part of the first number of printable media to be allocated as the second number of printable media to the second printing device 60.

For example, as illustrated in FIG. 12, when the first number of printable media of the first printing device 11 becomes equal to or smaller than the predetermined value, the allocator 94 limits the number of media to be allocated as the second umber of printable media to the second printing device 60. In the example illustrated in FIG. 12, the number of media allocatable among the first number of printable media of the first printing device 11 is limited to, for example, a number equal to or smaller than half the first number of printable media. Therefore, the number of media corresponding to "3,000 media" that are half of "6,000 media" that are the first number of printable media is allocated as the second number of printable media to the second printing device 60. As a result, "1500 media" converted by the converter 95 are allocated as the second number of printable media to the second printing device 60. Since the second number of printable media allocatable is limited in this manner, the first number of printable media is prevented from being excessively reduced.

The second number of printable media allocated from the first number of printable media may be transmitted to the second printing device 60 via the company server 70 or the service provider server 90. In this case, the second number of printable media allocated from the first number of printable media may be transmitted to the second printing device 60 via the information terminal 50. In addition, information of the second number of printable media may be transmitted to the information terminal 50. In this case, the printer drivers installed in the information terminal 50 or a management tool for printing management may manage the first number of printable media.

In addition, the second number of printable media allocated from the first number of printable media may be transmitted to the second printing device 60 via the USB memory 57 or the like. That is, the code indicating the second number of printable media is stored in the USB memory 57, and the teleworker who has brought the USB memory 57 back to the second location, which is the own home or the like, connects the USB memory 57 to the second printing device 60. By performing this, the second number of printable media allocated to the second printing device 60 is loaded in the second printing device 60.

The code generator 98 generates the second number of printable media as the code. The reader included in the second printing device 60 reads the code. The second number of printable media is set in the second printing device 60 by reading the code by the reader. For example, when a QR code is used as the code, the image reader 62 of the second printing device 60 reads the QR code printed by the first printing device 11 on the medium M so as to load information of the allocated second number of printable media in the second printing device 60.

The code includes the device information of the second printing device 60. When the code is read by the reader and the device information does not match the second printing device 60, the second number of printable media is not set in the second printing device 60. Therefore, even when the code is lost, there is no possibility that the code may be misused.

When the second number of printable media is loaded in the second printing device 60, the teleworker causes the information terminal 50 to output a print instruction to the second printing device 60. In this case, since the second printing device 60 is installed at the second location that is the own home or the like, the teleworker or the like may use the second printing device 60 to perform printing for private use. Therefore, the determiner 96 determines whether a medium to be printed by the second printing device 60 is a medium for business use or a medium for private use.

When the medium determined by the determiner 96 as the medium for business use is printed, only the number of media printed for business use is subtracted from the second number of printable media. On the other hand, when the medium determined by the determiner 96 as the medium for private use is printed, the number of media printed for private use is not subtracted from the second number of printable media.

The determiner 96 uses any of methods described in the following four examples to determine either printing for private use or printing for business use. The four examples are described below in order with reference to FIGS. 15 to 18.

First Example

As illustrated in FIG. 15, the teleworker causes the information terminal 50 to output a print instruction. The print instruction is transmitted to the first printing device 11 or the management terminal 80 via the network NW. Upon accepting the print instruction, the managing unit 31 of the first printing device 11 or the managing unit 83 of the management terminal 80 identifies the teleworker from identification information included in information of the print instruction. Then, the managing unit 31 or 83 accesses the attendance system 74 of the company server 70 to determine whether the teleworker is during work or outside of work based on attendance information of the corresponding teleworker. In addition, the managing unit 31 or 83 transmits, to the information terminal 50 or the second printing device 60, determination result information indicating whether the teleworker is during work. When the determination result information indicates that the teleworker is outside of work, the information terminal 50 causes the second printing device 60 to print details of the print instruction on the medium M for private use or the second printing device 60 prints the details of the print instruction on the medium M for private use. On the other hand, when the determination result information indicates that the teleworker is during work, the information terminal 50 causes the second printing device 60 to print the details of the print instruction on the medium M for business use or the second printing device 60 prints the details of the print instruction on the medium M for business use.

The information terminal 50 has the management tool installed therein. When the print instruction is given, the management tool installed in the second printing device 60 inquires the attendance information. When the print instruction is not transmitted to the first printing device 11 or the management terminal 80 via the network NW, it is not possible to determine whether the teleworker is during work and thus the second printing device 60 is instructed to perform printing for private use.

In this case, the information terminal 50 or the second printing device 60 copies the print data PD and transmits the copied print data PD to the company server 70. In addition, the information terminal 50 or the second printing device 60 transmits, to the managing unit 31 or 83, medium number information on the number of media printed by the teleworker for business use. The company server 70 receives the print data PD obtained when the teleworker performs printing for business use. The company server 70 stores the received print data PD in a storage unit not illustrated. Therefore, all the print data PD for business use is stored in the storage unit (not illustrated) of the company server 70.

In addition, upon receiving the medium number information on the number of media printed by the second printing device 60 for business use, the managing unit 31 or 83 subtracts the number of printed media based on this medium number information from the second number of printable media of the second printing device 60. Then, the managing unit 31 or 83 performs a counting process of increasing the second number of printed media by the number of printed media based on the medium number information.

Second Example

As illustrated in FIG. 16, the teleworker causes the information terminal 50 to output a print instruction. This print instruction is input to the first printing device 11 or the management terminal 80 via the network NW. The information terminal 50 includes the normal driver and the business-oriented driver as the printer drivers. That is, the teleworker installs, in the second printing device 60 of the teleworker, the business-oriented driver as a printer driver separately from the normal driver. In addition, the teleworker accesses the company server 70 or the service provider server 90 from the information terminal 50 to install the business-oriented driver. In this case, the management tool may be installed together with the business-oriented driver. This management tool is software having a determination function of determining whether a printer driver that outputs the print data PD is the normal driver or the business-oriented driver.

When the management tool determines that the printer driver that is the output source of the print data PD is the normal driver, the information terminal 50 determines private use (outside of work). When the management tool determines that the printer driver that is the output source of the print data PD is the business-oriented driver, the information terminal 50 determines business use (during work). When private use is determined, the second printing device 60 prints details of the print instruction on the medium M. On the other hand, when business use is determined, the second printing device 60 prints the details of the print instruction on the medium M and transmits the medium number information and the copied print data PD to the company. Specifically, the medium number information is transmitted to the first printing device 11 or the management terminal 80, and the number of printed media identified from the medium number information is subtracted from the second number of printable media. In addition, the copied print data PD is transmitted to the company server 70 and copied to the company server 70. Therefore, all the print data PD for business use is stored in the storage unit (not illustrated) of the company server 70. The management tool may be installed in the second printing device 60. In this case, the print data PD and the medium number information are transmitted from the second printing device 60.

Third Example

As illustrated in FIG. 17, the teleworker causes either the information terminal 50A personally owned or the company-side information terminal 50B lent or provided by the company to output a print instruction. Specifically, when private use is determined, the teleworker causes the personally owned information terminal 50A to output a print instruction. When business use is determined, the teleworker causes the company-side information terminal 50B to output the print instruction. This print instruction is transmitted to the first printing device 11 or the management terminal 80 via the network NW. The managing unit 31 or 83 acquires the MAC address of the information terminal 50 that is the source of the print instruction. The MAC address of the information terminal 50 for business is registered in the managing units 31 and 83 in advance. The managing unit 31 or 83 determines whether the acquired MAC address is an address registered for business. When the MAC address is an unregistered address, the managing unit 31 or 83 determines private use. When the MAC address is the registered address, the managing unit 31 or 83 determines business use. Information of the result of the determination is transmitted from the first printing device 11 or the management terminal 80 installed at the first location to the information terminal 50 or the second printing device 60 installed at the second location. After that, the information terminal 50 or the second printing device 60 performs either printing for private use or printing for business use based on the information of the result of the determination. In this case, when business use is determined, the second printing device 60 prints details of the print instruction on the medium M, transmits the copied print data PD to the company server 70, and transmits the medium number information to the management terminal 80 or the first printing device 11 in the same manner as in the first example. The determination of the MAC address may be made by the management tool installed in the information terminal 50 or the management tool installed in the second printing device 60.

Fourth Example

As illustrated in FIG. 18, the teleworker causes the personally owned information terminal 50 to output a print instruction. In the fourth example, when a part of the number of printable media is allocated by the first printing device 11 to the second printing device 60, the USB memory 57 is connected to the first printing device 11 or the management terminal 80. Then, the first printing device 11 or the management terminal 80 stores the code to the USB memory 57. The teleworker receives the USB memory 57 at the company and brings the USB memory 57 back to the own home. The teleworker connects the USB memory 57 to the second printing device 60 in order to use the second printing device 60 to perform printing for business use. The code stored in the USB memory 57 includes a code relating to the second number of printable media and a code for permitting printing for business use.

Therefore, when a print instruction is output from the information terminal 50 in a state in which the USB memory 57 is not connected to the second printing device 60, the second printing device 60 prints details of the print instruction on the medium M for private use. When a print instruction is output from the information terminal 50 in a state in which the USB memory 57 is connected to the second printing device 60, the second printing device 60 prints details of the print instruction on the medium M for business use. When printing is performed for business use, the medium number information is transmitted from the information terminal 50 or the second printing device 60 installed at the second location to the first printing device 11 or the management terminal 80 installed at the first location. In addition, the copied print data PD is transmitted to the company server 70 from the information terminal 50 or the second printing device 60 installed at the second location.

Regarding Request to Deliver Printing Agent

The amount (for example, the amount of ink) of a liquid that is an example of the printing agent of the second printing device 60, which is a home printer, may be monitored, and when the liquid is almost used up, a printing agent for an amount used for business use may be delivered to the second location that is the own home or the like. Specifically, when the amount of the used printing agent estimated by the estimator 97 reaches a predetermined value, a request to provide a printing agent for the amount of the used printing agent is given. In this case, the predetermined value is a used amount corresponding to one bottle or one cartridge. The controller of the second printing device 60 includes a consumed liquid amount measuring unit having the same function as that of the consumed liquid amount measuring unit 33 included in the first printing device 11. The consumed liquid amount measuring unit measures the amount of a liquid consumed by the second printing device 60 for printing and the recovery operation. When a cumulative value of the amount of the liquid consumed to perform printing for business use reaches a predetermined value, a request to deliver a printing agent (for example, ink) for one bottle or one cartridge to the second location such as the own home or the like of the teleworker is given by any one of the second printing device 60, the information terminal 50, the management terminal 80, and the first printing device 11 to the service provider server 90.

The second printing device 60 is an ink jet printing device that performs printing by ejecting ink. Therefore, the second printing device 60 performs the recovery operation to prevent or clear the clogging of a nozzle of the print head 67B. When it is determined that the recovery operation performed by the second printing device 60 relates to a medium for business use, the amount of the printing agent used for the recovery operation is added to the amount of the printing agent used. In this case, when the added amount of the printing agent used reaches a predetermined value, a request to provide a printing agent for the amount of the printing agent used is given. When a cumulative value of the amount of a liquid consumed to perform printing for business use and the recovery operation reaches the predetermined value, a printing agent is also delivered to the home where the teleworker works. Therefore, it is possible to avoid a non-printable period of the second printing device 60 due to the lack of a new available liquid supply source.

Effects of the embodiment are described below.

(1) The printing system 10 includes the acquirer 91, the comparator 92, the calculator 93, and the allocator 94. The acquirer 91 acquires the number of media printed by the first printing device 11 installed at the first location. The comparator 92 compares the number of printed media acquired by the acquirer 91 with the number of media specified based on the billing amount. The calculator 93 calculates the first number of printable media of the first printing device 11 based on the comparison by the comparator 92. The allocator 94 allocates at least a part of the first number of printable media calculated by the calculator 93 as the second number of printable media to the second printing device 60 installed at the second location. The second printing device 60 can perform printing as a billing target based on the second number of printable media. According to this configuration, in a flat-rate printing service, when the number of media to be printed in the office is reduced due to teleworking or the like, it is possible to reduce the possibility that a monthly fee may be high for the number of media to be printed.

(2) The printing system 10 includes the converter 95 that performs conversion between the first number of printable media and the second number of printable media before at least a part of the first number of printable media is allocated as the second number of printable media. The converter 95 performs the conversion between the first number of printable media and the second number of printable media based on the printing information of the first printing device 11 and the printing information of the second printing device 60. According to this configuration, since the printing cost of the first printing device 11 is different from the printing cost of the second printing device 60, the converter 95 converts the number of printable media for each of the printing devices, thereby being able to reduce the possibility that the specified number of media may significantly decrease. In addition, the user can avoid a cumbersome operation of allocating the number of printable media for each of the printing devices in consideration of the fact that the printing cost of the first printing device 11 is different from the printing cost of the second printing device 60. In addition, it is possible to avoid a situation in which the printing cost is too high for the monthly fee when the number of printable media is allocated without being converted.

(3) As the printing information, a cost of printing per medium is used. According to this configuration, since the printing cost of the first printing device 11 is different from the printing cost of the second printing device 60, the conversion is performed to convert the number of printable media for each of the printing devices, thereby reducing the possibility that the specified number of media may significantly decrease. In addition, the user can avoid a cumbersome operation of allocating the number of printable media for each of the printing devices in consideration of the fact that the printing cost of the first printing device 11 is different from the printing cost of the second printing device 60. Furthermore, it is possible to avoid a situation in which the printing cost is too high for the monthly fee when the number of printable media is allocated without being converted.

(4) The printing system 10 includes the determiner 96 that determines whether a medium to be printed by the second printing device 60 is a medium for business use or a medium for private use. When the medium determined by the determiner 96 as the medium for business use is printed, only the number of media printed for business use is subtracted from the second number of printable media. When the medium determined by the determiner 96 as the medium for private use is printed, the number of media printed for private use is not subtracted from the second number of printable media. According to this configuration, since the number of printed media is subtracted from the number of printable media only when a user performs printing for business use, the number of printable media is not subtracted at the time of printing for private use, and it is possible to reduce a disadvantage of the company that has the contract with the service providing company that provides the flat-rate printing service.

(5) The printing system 10 includes the estimator 97 that estimates, based on the number of media printed by the second printing device 60 for business use, the amount of a printing agent used by the second printing device 60. According to this configuration, it is possible to estimate how much the printing agent (for example, ink or the like) was used to perform printing for private use and business use. For example, according to the subscription contract, the service providing company needs to supply ink for the specified number of media or less. In this case, the second printing device 60 may be used to perform printing for private use. Since printing for private use is outside the subscription contract, it is necessary to provide the user with only a printing agent for the amount of the printing agent used to perform printing for business use. In this case, since it is possible to estimate the amount of the printing agent used to perform printing for business use, it is possible to provide the user with a required amount of a printing agent.

(6) When the amount of the used printing agent estimated by the estimator 97 reaches the predetermined amount, a request to provide a printing agent in the predetermined amount is given. According to this configuration, it is possible to prevent the printing agent from being excessively supplied to the user, while reducing the possibility that the printing agent of the user may be used up.

(7) The second printing device 60 is an ink jet printing device that performs printing by ejecting ink. When it is determined that the recovery operation performed by the second printing device 60 relates to a medium for business use, the amount of the printing agent used for the recovery operation is added to the amount of the printing agent used. According to this configuration, when it is determined that the recovery operation relates to the medium for business use, the amount of the printing agent used for the recovery operation is added to the amount of the printing agent used. Therefore, it is possible to prevent a reduction in the amount of ink to be used to perform printing for private use.

(8) The allocator 94 can allocate at least a part of the second number of printable media as the first number of printable media to the first printing device 11. When it is determined that the first number of printable media is equal to or smaller than the predetermined value, the allocator 94 allocates the second number of printable media as the first number of printable media to the first printing device 11. According to this configuration, it is possible to avoid a situation in which the number of media printable in the office is reduced and a user of a medium cannot perform printing in the office.

(9) The printing system 10 includes the code generator 98 that generates the second number of printable media as the code, and the image reader 62 that is included in the second printing device 60 and is an example of the reader that reads the code. The second number of printable media is set in the second printing device 60 by reading the code by the image reader 62. According to this configuration, even when the second printing device 60 is not connected to the network, the number of printable media can be received and transmitted by the second printing device 60.

(10) The code includes the device information of the second printing device 60. When the code is read by the image reader 62 and the device information does not match the second printing device 60, the second number of printable media is not set in the second printing device 60. According to this configuration, even when the code is lost, there is no possibility that the code may be misused by another party.

(11) The first location is an office and the second location is a location other than the office. According to this configuration, it is possible to allocate at least a part of the first number of printable media as the second number of printable media to the second printing device 60 that is used to perform printing at the location other than the office.

The aforementioned embodiment can be modified to embodiments such as modifications described below. In addition, an example obtained by combining the embodiment with one or more of the modifications described below as appropriate can be used as another modification. An example obtained by combining two or more of the modifications described below as appropriate can be used as a modification.

As the printing information, information other than the cost of printing per medium may be used.

The rate of the conversion by the converter 95 may be changed based on statistical information for each month. That is, the converter 95 may be configured to convert the number of printable media using the conversion rate determined based on the statistical information for each month.

Although the cost of printing per medium in the second printing device 60 is higher than the cost of printing per medium in the first printing device 11 as an example, the cost of printing per medium in the second printing device 60 may be lower than the cost of printing per medium in the first printing device 11.

The number of printed media corresponding to the amount of a liquid consumed for the recovery operation may not be included in the number of printed media determined based on the amount of a liquid to be consumed. For example, the amount of a liquid consumed for flushing (idle ejection) may be calculated as the number of printed media and included in the number of printed media, but the amount of a liquid consumed for cleaning may not be calculated as the number of printed media and included in the number of printed media. Alternatively, the amount of a liquid consumed for flushing and the amount of a liquid consumed for cleaning may not be calculated as the numbers of printed media and included in the number of printed media.

Whether the amount of a liquid consumed for flushing is calculated as the number of printed media and included in the number of printed media may be determined based on the ratio of the number of media printed for business use after the previous flushing and before the current flushing and the number of media printed for private use after the previous flushing and before the current flushing.

The medium M is not limited to a paper sheet and may be a film made of synthetic resin, a sheet made of synthetic resin, cloth, non-woven cloth, a complex film (laminated film) of synthetic resin and metal, metal foil, a ceramic sheet, or the like.

The first printing device 11 is not limited to a line printer or a serial printer and may be a page printer. In addition, the second printing device 60 is not limited to a serial printer and may be a line printer or a page printer.

The first printing device 11 is not limited to an ink jet printer and may be a laser printer. In this case, the printing agent is toner. In addition, in this case, the second printing device 60 may be an ink jet printer. In this case, the printing information may be information on the cost of toner and ink (liquid) per medium. The second printing device 60 may be a laser printer or a dot impact printer.

Technical ideas understood from the embodiment and the modifications are described together with effects.

(A) A printing system includes an acquirer that acquires the number of media printed by a first printing device installed at a first location, a comparator that compares the number of printed media acquired by the acquirer with the number of media specified based on a billing amount, a calculator that calculates a first number of printable media of the first printing device based on the comparison by the comparator, and an allocator that allocates at least a part of the first number of printable media calculated by the calculator as a second number of printable media to a second printing device installed at a second location. The second printing device can perform printing as a billing target based on the second number of printable media.

According to this configuration, in a flat-rate printing service, when the number of media to be printed in an office is reduced due to teleworking or the like, it is possible to reduce the possibility that a monthly fee may be too high for the number of media to be printed.

(B) The printing system may include a converter that performs conversion between the first number of printable media and the second number of printable media before at least a part of the first number of printable media is allocated as the second number of printable media, and the converter may perform the conversion between the first number of printable media and the second number of printable media based on printing information of the first printing device and printing information of the second printing device.

According to this configuration, since the printing cost of the first printing device is different from the printing cost of the second printing device, the conversion is performed to convert the number of printable media for each of the printing devices, thereby being able to reduce the possibility that the specified number of media may significantly decrease. In addition, a user can avoid a cumbersome operation of allocating the number of printable media for each of the printing devices in consideration of the fact that the printing cost of the first printing device is different from the printing cost of the second printing device. For example, it is possible to avoid a situation in which the printing cost is much higher than expected when the number of printable media is allocated without being converted.

(C) In the printing system, as the printing information, a cost of printing per medium may be used.

According to this configuration, since the printing cost of the first printing device is different from the printing cost of the second printing device, the conversion is performed to convert the number of printable media for each of the printing devices, thereby being able to reduce the possibility that the specified number of media to be printed may significantly decrease. In addition, the user can avoid a cumbersome operation of allocating the number of printable media for each of the printing devices in consideration of the fact that the printing cost of the first printing device is different from the printing cost of the second printing device. For example, it is possible to avoid a situation in which the printing cost is much higher than expected when the number of printable media is allocated without being converted.

(D) The printing system may include a determiner that determines whether a medium to be printed by the second printing device is a medium for business use or a medium for private use. When the medium determined by the determiner as the medium for business use is printed, only the number of media printed for business use is subtracted from the second number of printable media. When the medium determined by the determiner as the medium for private use is printed, the number of media printed for private use is not subtracted from the second number of printable media.

According to this configuration, since the number of printed media is subtracted from the number of printable media only when the user performs printing for business use, the number of media printed for private use is not subtracted from the number of printable media, and it is possible to reduce a disadvantage of a company that has a contract with a service providing company that provides a flat-rate printing service.

(E) The printing system may include an estimator that estimates, based on the number of media printed by the second printing device for business use, an amount of a printing agent used by the second printing device.

According to this configuration, it is possible to estimate how much a printing agent (for example, ink or the like) was used to perform printing for private use and business use. According to a subscription contract, the service providing company has to supply ink for the specified number of media or less. In this case, the second printing device may be used to perform printing for private use. Since the printing for private use is outside the subscription contract, it is necessary to provide the user with only a printing agent for the amount of a printing agent used to perform printing for business use. Since it is possible to estimate the amount of a printing agent used to perform printing for business use, it is possible to provide the user with a required amount of a printing agent.

(F) In the printing system, when the amount of the used printing agent estimated by the estimator reaches a predetermined amount, a request to provide a printing agent in the predetermined amount may be given.

According to this configuration, it is possible to prevent ink from being excessively supplied to the user, while reducing the possibility that ink of the user may be used up.

(G) In the printing system, the second printing device may be an ink jet printing device that performs printing by ejecting ink. When it is determined that a recovery operation performed by the second printing device relates to the medium for business use, an amount of the printing agent used for the recovery operation may be added to the amount of the printing agent used.

According to this configuration, when it is determined that the recovery operation relates to the medium for business use, the amount of the printing agent used for the recovery operation is added to the amount of the printing agent used. Therefore, it is possible to prevent a reduction in the amount of ink to be used by the user to perform printing for private use.

(H) In the printing system, the allocator may be able to allocate at least a part of the second number of printable media as the first printing number of printable media to the first printing device. When it is determined that the first number of printable media is equal to or smaller than a predetermined value, the allocator may allocate the second number of printable media as the first number of printable media to the first printing device.

According to this configuration, it is possible to avoid a situation in which the number of media printable in the office is reduced and a user of a medium cannot perform printing in the office.

(I) The printing system may include a code generator that generates the second number of printable media as a code, and a reader that is included in the second printing device and reads the code. The second number of printable media may be set in the second printing device by reading the code by the reader.

According to this configuration, even when the second printing device is not connected to a network, the number of printable media can be received and transmitted by the second printing device.

(J) In the printing system, the code may include device information of the second printing device. When the code is read by the reader and the device information does not match the second printing device, the second number of printable media may not be set in the second printing device.

According to this configuration, even when the code is lost, there is no possibility that the code may be misused.

(K) In the printing system, the first location may be an office, and the second location may be a location other than the office.

According to this configuration, it is possible to allocate at least a part of the first number of printable media as the second number of printable media to the second printing device that is used to perform printing at the location other than the office.

What is claimed is:

1. A printing system comprising:
    a first printing device installed at a first location and being configured to accept a first print instruction;
    a second printing device installed at a second location and being configured to accept a second print instruction;
    an acquirer that acquires a number of media printed by the first printing device;
    a comparator that compares the number of printed media acquired by the acquirer with a maximum number of printable media specified based on a fixed billing amount;
    a calculator that calculates a first number of printable media of the first printing device based on the comparison by the comparator;
    an allocator that allocates at least a part of the first number of printable media calculated by the calculator as a second number of printable media, which is the number of printable media of the second printing device; and
    a determiner that determines whether a medium to be printed by the second printing device is a medium for business use or a medium for private use, wherein
    the first and second print instructions are independent print instructions,
    the second printing device is configured to perform printing as a billing target based on the second number of printable media when accepting the second print instruction,
    when the medium determined by the determiner as the medium for business use is printed, only the number of media printed for business use is subtracted from the second number of printable media, and
    when the medium determined by the determiner as the medium for private use is printed, the number of media printed for private use is not subtracted from the second number of printable media.

2. The printing system according to claim 1, further comprising:
    a converter that performs conversion between the first number of printable media and the second number of printable media before at least a part of the first number of printable media is allocated as the second number of printable media, wherein
    the converter performs the conversion between the first number of printable media and the second number of printable media based on printing information of the first printing device and printing information of the second printing device.

3. The printing system according to claim 2, wherein as the printing information, a cost of printing per medium is used.

4. The printing system according to claim 1, further comprising an estimator that estimates, based on the number of media printed by the second printing device for business use, an amount of a printing agent used by the second printing device.

5. The printing system according to claim 4, wherein when the amount of the used printing agent estimated by the estimator reaches a predetermined amount, a request to provide a printing agent in the predetermined amount is given.

6. The printing system according to claim 4, wherein the second printing device is an ink jet printing device that performs printing by ejecting ink, and when it is determined that a recovery operation performed by the second printing device relates to the medium for business use, an amount of the printing agent used for the recovery operation is added to the amount of the printing agent used.

7. The printing system according to claim 1, wherein the allocator can allocate at least a part of the second number of printable media as the first number of printable media to the first printing device, and when the first number of printable media is equal to or smaller than a predetermined value, the allocator allocates the second number of printable media as the first number of printable media to the first printing device.

8. The printing system according to claim 1, further comprising:
a code generator that generates the second number of printable media as a code; and
a reader that is included in the second printing device and reads the code, wherein
the second number of printable media is set in the second printing device by reading the code by the reader.

9. The printing system according to claim 8, wherein the code includes device information of the second printing device, and when the reader reads the code and the device information does not match the second printing device, the second number of printable media is not set in the second printing device.

10. The printing system according to claim 1, wherein the first location is an office and the second location is a location other than the office.

11. The printing system according to claim 1, wherein the first print instruction is not output to the second printing device, but directly to the first printing device, and the second print instruction is not output to the first printing device, but directly to the second printing device.

12. A printing system comprising:
a processor;
a non-transitory computer readable medium having stored thereon executable instructions that when executed by the processor cause the printing system to instantiate:
an acquirer that acquires a number of media printed by a first printing device installed at a first location;
a comparator that compares the number of printed media acquired by the acquirer with a number of media specified based on a billing amount;
a calculator that calculates a first number of printable media of the first printing device based on the comparison by the comparator; and
an allocator that allocates at least a part of the first number of printable media calculated by the calculator as a second number of printable media to a second printing device installed at a second location; and
a determiner that determines whether a medium to be printed by the second printing device is a medium for business use or a medium for private use, wherein the second printing device can perform printing as a billing target based on the second number of printable media, when the medium determined by the determiner as the medium for business use is printed, only the number of media printed for business use is subtracted from the second number of printable media, and when the medium determined by the determiner as the medium for private use is printed, the number of media printed for private use is not subtracted from the second number of printable media.

13. The printing system according to claim 12, further comprising an estimator that estimates, based on the number of media printed by the second printing device for business use, an amount of a printing agent used by the second printing device.

14. The printing system according to claim 13, wherein when the amount of the used printing agent estimated by the estimator reaches a predetermined amount, a request to provide a printing agent in the predetermined amount is given.

15. The printing system according to claim 13, wherein the second printing device is an ink jet printing device that performs printing by ejecting ink, and when it is determined that a recovery operation performed by the second printing device relates to the medium for business use, an amount of the printing agent used for the recovery operation is added to the amount of the printing agent used.

16. A printing system comprising:
a processor;
a non-transitory computer readable medium having stored thereon executable instructions that when executed by the processor cause the printing system to instantiate:
an acquirer that acquires a number of media printed by a first printing device installed at a first location;
a comparator that compares the number of printed media acquired by the acquirer with a number of media specified based on a billing amount;
a calculator that calculates a first number of printable media of the first printing device based on the comparison by the comparator;
an allocator that allocates at least a part of the first number of printable media calculated by the calculator as a second number of printable media to a second printing device installed at a second location; and
a code generator that generates the second number of printable media as a code; and
a reader that is included in the second printing device and reads the code, wherein
the second printing device can perform printing as a billing target based on the second number of printable media, and
the second number of printable media is set in the second printing device by reading the code by the reader.

17. The printing system according to claim 16, wherein the code includes device information of the second printing device, and when the reader reads the code and the device information does not match the second printing device, the second number of printable media is not set in the second printing device.

* * * * *